United States Patent
Fujikura et al.

(10) Patent No.: US 9,946,050 B2
(45) Date of Patent: *Apr. 17, 2018

(54) IMAGE FORMING LENS SYSTEM AND IMAGE PICKUP APPARATUS USING THE SAME

(71) Applicant: Olympus Corporation, Tokyo (JP)

(72) Inventors: Takashi Fujikura, Tokyo (JP); Keisuke Ichikawa, Tokyo (JP); Kazuteru Kawamura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,439

(22) Filed: Jun. 22, 2016

(65) Prior Publication Data
US 2016/0306186 A1    Oct. 20, 2016

Related U.S. Application Data

(62) Division of application No. 14/553,643, filed on Nov. 25, 2014, now Pat. No. 9,400,371.

(30) Foreign Application Priority Data

Nov. 27, 2013 (JP) .................................. 2013-245212

(51) Int. Cl.
*G02B 9/04* (2006.01)
*G02B 27/64* (2006.01)
(Continued)

(52) U.S. Cl.
CPC .................. *G02B 9/04* (2013.01); *G02B 7/04* (2013.01); *G02B 9/60* (2013.01); *G02B 15/173* (2013.01);
(Continued)

(58) Field of Classification Search
CPC ... G02B 9/00; G02B 9/04; G02B 9/06; G02B 9/10; G02B 9/60–9/64; G02B 27/646
(Continued)

(56) References Cited

U.S. PATENT DOCUMENTS

| 4,844,602 A | 7/1989 | Kitagishi et al. |
| 5,018,845 A | 5/1991 | Yamazaki |

(Continued)

FOREIGN PATENT DOCUMENTS

| JP | 11-160617 | 6/1999 |
| JP | 2008-145584 | 6/2008 |
| JP | 2012-145789 | 8/2012 |

*Primary Examiner* — Darryl J Collins
(74) *Attorney, Agent, or Firm* — Andrews Kurth Kenyon LLP

(57) ABSTRACT

An image forming lens system includes a front lens unit having a positive refractive power, and a rear lens unit, and does not include any other lens unit. The front lens unit includes a first lens unit having a positive refractive power and a second lens unit having a negative refractive power. Each of the first lens unit and the second lens unit includes a positive lens and a negative lens. The second lens unit is a focusing lens unit. The rear lens unit includes a positive lens and a negative lens. The second lens unit is the only lens unit that moves, in the front lens unit, and the following conditional expressions (1) and (2') are satisfied:

$$0.5 < f_{FF}/f < 1.65 \quad (1)$$

$$0 \le |f/r_{G2b}| < 6.5 \quad (2').$$

20 Claims, 12 Drawing Sheets

(51) Int. Cl.
    *H04N 5/232*     (2006.01)
    *G02B 15/173*     (2006.01)
    *G02B 7/04*     (2006.01)
    *G02B 9/60*     (2006.01)
    *G02B 27/00*     (2006.01)
    *H04N 5/225*     (2006.01)

(52) U.S. Cl.
    CPC ....... *G02B 27/0025* (2013.01); *G02B 27/646* (2013.01); *H04N 5/2254* (2013.01); *H04N 5/23229* (2013.01)

(58) Field of Classification Search
    USPC .......................... 359/754, 763–766, 793–795
    See application file for complete search history.

(56) References Cited

U.S. PATENT DOCUMENTS

| | | |
|---|---|---|
| 5,579,160 A | 11/1996 | Sato |
| 5,751,486 A | 5/1998 | Misawa et al. |
| 8,988,792 B2 | 3/2015 | Fujimoto |
| 9,400,371 B2 * | 7/2016 | Fujikura ............... G02B 27/646 |

\* cited by examiner

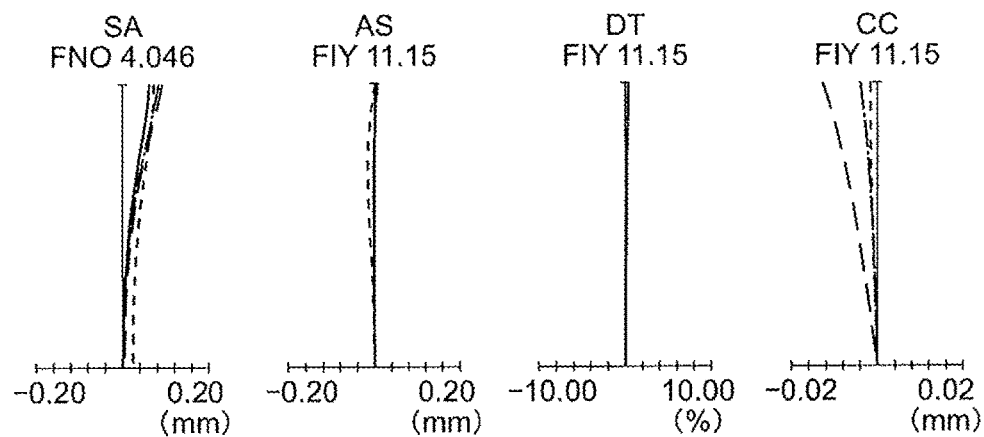
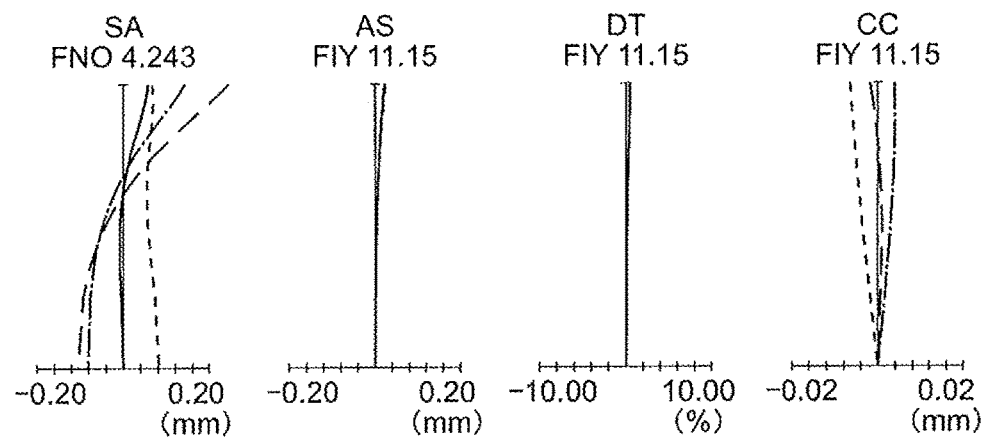

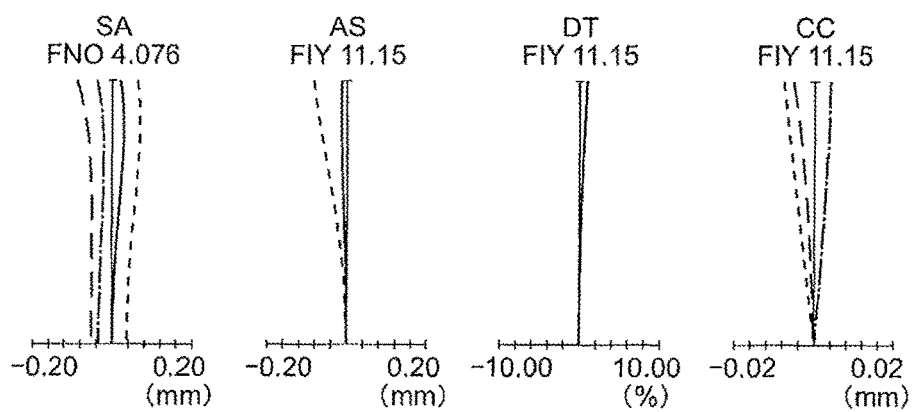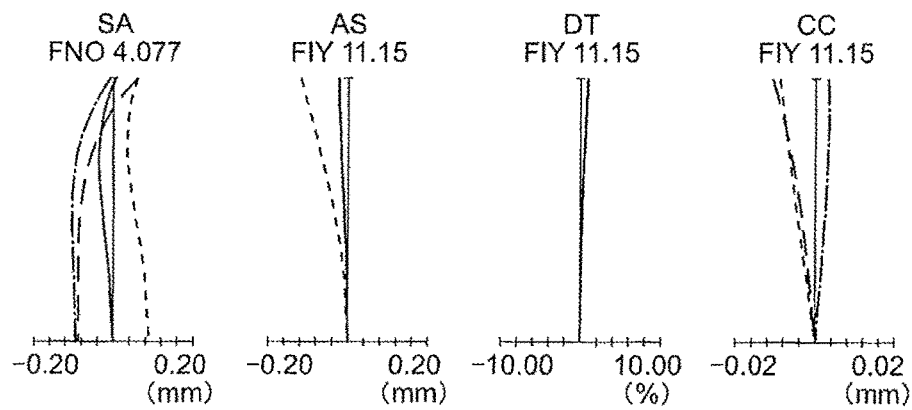

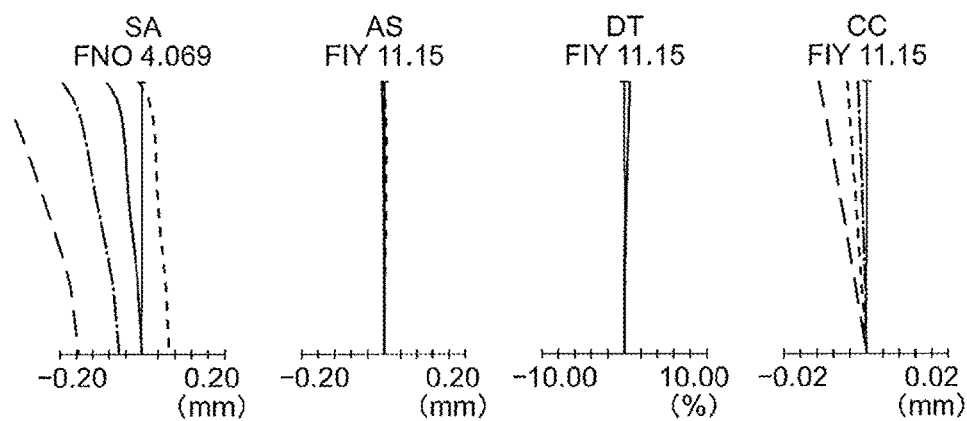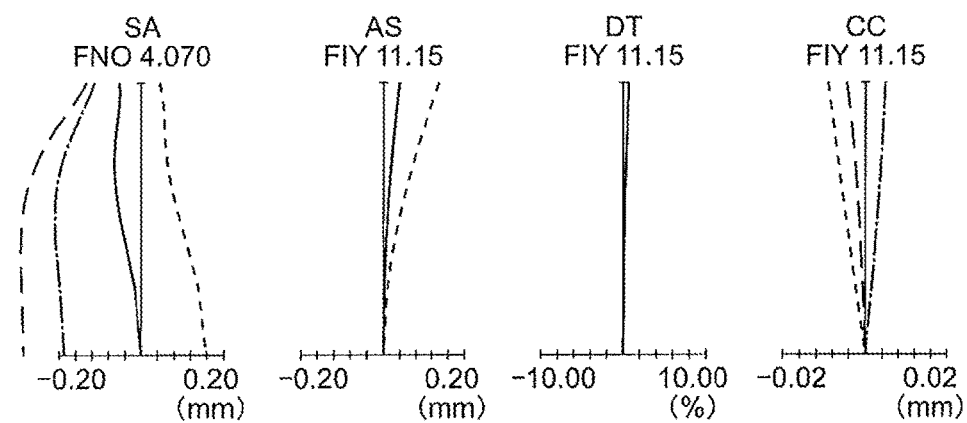

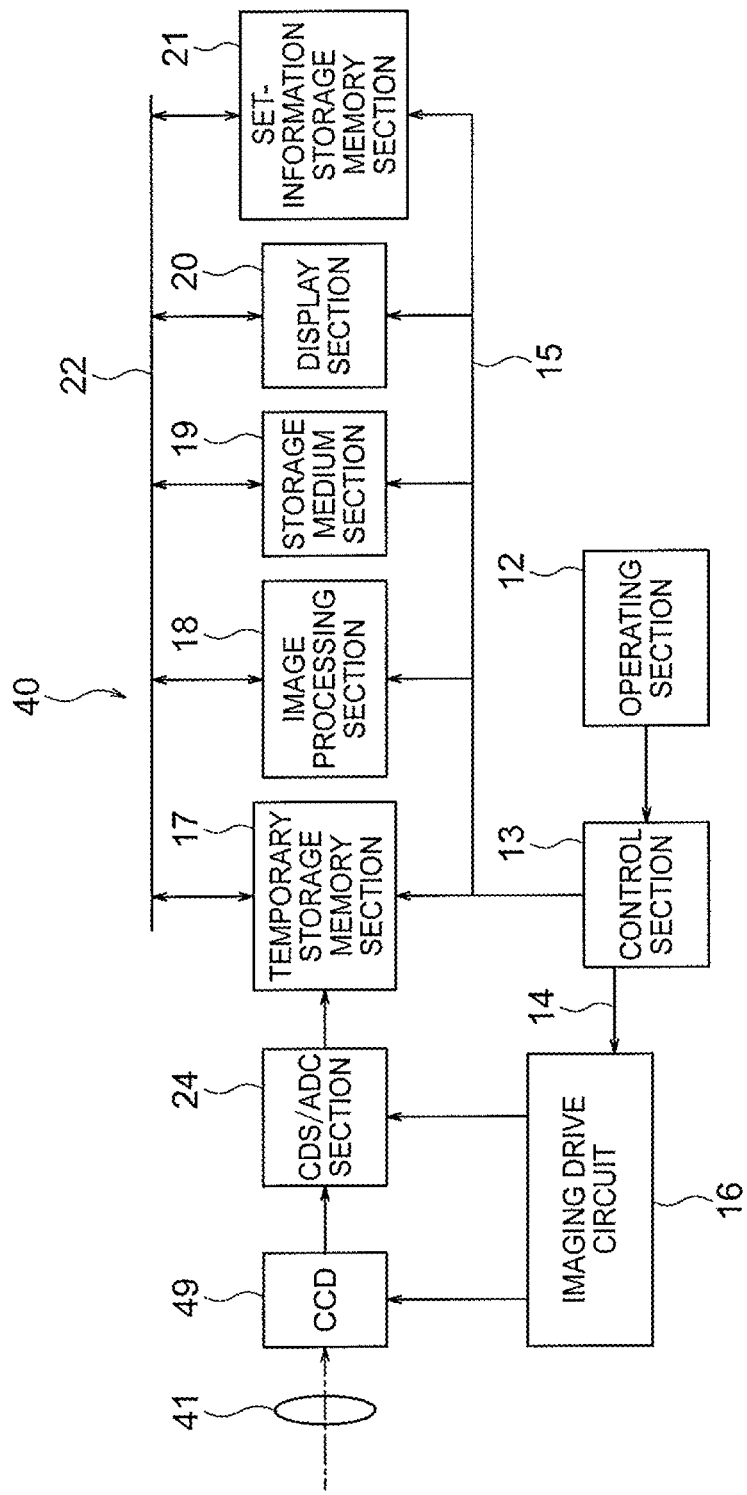

IMAGE FORMING LENS SYSTEM AND IMAGE PICKUP APPARATUS USING THE SAME

CROSS-REFERENCE TO RELATED APPLICATIONS

The present application is a divisional of U.S. patent application Ser. No. 14/553,643 filed on Nov. 25, 2014, which is based upon and claims the benefit of priority from the prior Japanese Patent Application No. 2013-245212 filed on Nov. 27, 2013; the entire contents of which are incorporated herein by reference.

BACKGROUND OF THE INVENTION

Field of the Invention

The present invention relates to an image forming lens system, and an image pickup apparatus using the same.

Description of the Related Art

In a photography in which, a telephoto lens or an ultra-telephoto lens (hereinafter, appropriately let to be telephoto lens) is used, an effect of drawing a distant object or a small object in front of an eye of a photographer is achieved. Therefore, the telephoto lens has widely been used in photography of various scenes such as photography of sport scenes, photography of wild animals such as wild birds, and photography of astronomical bodies.

As a telephoto lens to be used for photography of such scenes, telephoto lenses disclosed in Japanese Patent Application Laid-open Publication Nos. 2008-145584 and Hei 11-160617 are available.

In the photography of abovementioned scenes, relative merits of mobility of an image pickup apparatus become important. Here, the mobility refers to an ease of carrying, a stability at the time of hand-held photography, and a rapidity of focusing speed. For making the mobility of an apparatus superior, an optical system having a small size and light weight is desirable. Moreover, a feature that an optical system is capable of focusing an object rapidly is an important feature that decides the relative merits of mobility.

SUMMARY OF THE INVENTION

An image forming lens system according to the present invention includes in order from an object side to an image side along an optical axis, a front lens unit having a positive refractive power, and
a rear lens unit, wherein
the image forming lens system does not include any other lens unit on the optical axis, and
the front lens unit includes in order from the object side to the image side, a first lens unit having a positive refractive power and a second lens unit having a negative refractive power, and
each of the first lens unit and the second lens unit includes a positive lens and a negative lens, and
the second lens unit is a focusing lens unit, and
the focusing lens unit moves toward an image side along the optical axis at the time of focusing operation from an object at infinity to an object at a close distance, and
the rear lens unit includes a positive lens and a negative lens, and
the second lens unit is the only lens unit that moves, in the front lens unit, and
the following conditional expressions (1) and (2') are satisfied:

$$0 < f_{FF}/f < 1.65 \quad (1)$$

$$0 \le |f/r_{G2b}| < 6.5 \quad (2')$$

where,
$f_{FF}$ denotes a focal length of the front lens unit at the time of focusing at an object at infinity,
f denotes a focal length of the image forming lens system at the time of focusing at an object at infinity, and
$r_{G2b}$ denotes a paraxial radius of curvature of a lens surface on the object side of the second lens unit, immediately before the object.

Moreover, an image forming lens system according to the present invention includes in order from an object side to an image side along an optical axis, a front lens unit having a positive refractive power, and
a rear lens unit, wherein
the image forming lens system does not include any other lens unit on the optical axis, and
the front lens unit includes in order from the object side to the image side, a first lens unit having a positive refractive power, and a second lens unit having a negative refractive power, and
each of the first lens unit and the second lens unit includes a positive lens and a negative lens, and
the second lens unit is a focusing lens unit, and
the focusing lens unit moves toward an image side along the optical axis at the time of focusing operation from an object at infinity to an object at a close distance, and
the rear lens unit includes a positive lens and a negative lens, and
the second lens unit is the only lens unit that moves, in the front lens unit, and
the following conditional expressions (2) and (3) are satisfied:

$$0 \le |f/r_{G2b}| < 7.0 \quad (2)$$

$$0.27 < |f_{fo}|/f < 0.6 \quad (3)$$

where,
f denotes a focal length of the image forming lens system at the time of focusing at an object at infinity,
$r_{G2b}$ denotes a paraxial radius of curvature of a lens surface on the object side of the second lens unit, immediately before the object, and
$f_{fo}$ denotes a focal length of the second lens unit.

Furthermore, an image forming lens system according to the present invention includes in order from an object side to an image side along an optical axis, a front lens unit having a positive refractive power, and
a rear lens unit, wherein
the image forming lens system does not include any other lens unit on the optical axis, and
the front lens unit includes in order from the object side to the image side, a first lens unit having a positive refractive power and a second lens unit having a negative refractive power, and
each of the first lens unit and the second lens unit includes a positive lens and a negative lens, and
the second lens unit is a focusing lens unit, and
the focusing lens unit moves toward an image side along the optical axis at the time of focusing operation from an object at infinity to an object at a close distance, and
the rear lens unit includes a positive lens and a negative lens, and
the second lens unit is the only lens unit that moves, in the front lens unit, and
the focusing lens unit includes two lenses, and the following conditional expressions (2) and (3') are satisfied:

$$0 \leq |f/r_{G2b}| < 7.0 \quad (2)$$

$$0.12 < |f_{fo}|/f < 0.4 \quad (3')$$

where, f denotes a focal length of the image forming lens system at the time of focusing at an object at infinity, $r_{G2b}$ denotes a paraxial radius of curvature of a lens surface on the object side of the second lens unit, immediately before the object, and $f_{fo}$ denotes a focal length of the second lens unit.

Moreover, an image pickup apparatus according to the present invention includes, an optical system, and an image pickup element which has an image pickup surface, and which converts an image formed on the image pickup surface by the optical system to an electric signal, wherein the optical system is one of the abovementioned image forming lens systems.

BRIEF DESCRIPTION OF THE DRAWINGS

FIG. 1A is a lens cross-sectional view of an image forming lens system according to an example 1, and FIG. 1B is a lens cross-sectional view of an image forming lens system according to an example 2;

FIG. 2A is a lens cross-sectional view of an image forming lens system according to an example 3, and FIG. 2B is a lens cross-sectional view of an image forming lens system according to an example 4;

FIG. 3 is a lens cross-sectional view of an image forming lens system according to an example 5;

FIG. 5A, FIG. 5B, FIG. 5C, and FIG. 5D are aberration diagrams at the time of focusing at an object at infinity of the image forming lens system according to the example 2, and FIG. 5E, FIG. 5F, FIG. 5G, and FIG. 5H are aberration diagrams at the time of focusing at an object at a close distance of the image forming lens system according to the example 2;

FIG. 7A, FIG. 7B, FIG. 7C, and FIG. 7D are aberration diagrams at the time of focusing at an object at infinity of the image forming lens system according to the example 4, and FIG. 7E, FIG. 7F, FIG. 7G, and FIG. 7H are aberration diagrams at the time of focusing at an object at a close distance of the image forming lens system according to the example 4;

FIG. 8A, FIG. 8B, FIG. 8C, and FIG. 8D are aberration diagrams at the time of focusing at an object at infinity of the image forming lens system according to the example 5, and FIG. 8E, FIG. 8F, FIG. 8G, and FIG. 8H are aberration diagrams at the time of focusing at an object at a close distance of the image forming lens system according to the example 5;

FIG. 12 is a schematic block diagram of an internal circuit of main components of the digital camera.

DETAILED DESCRIPTION OF THE INVENTION

Figure 1A:
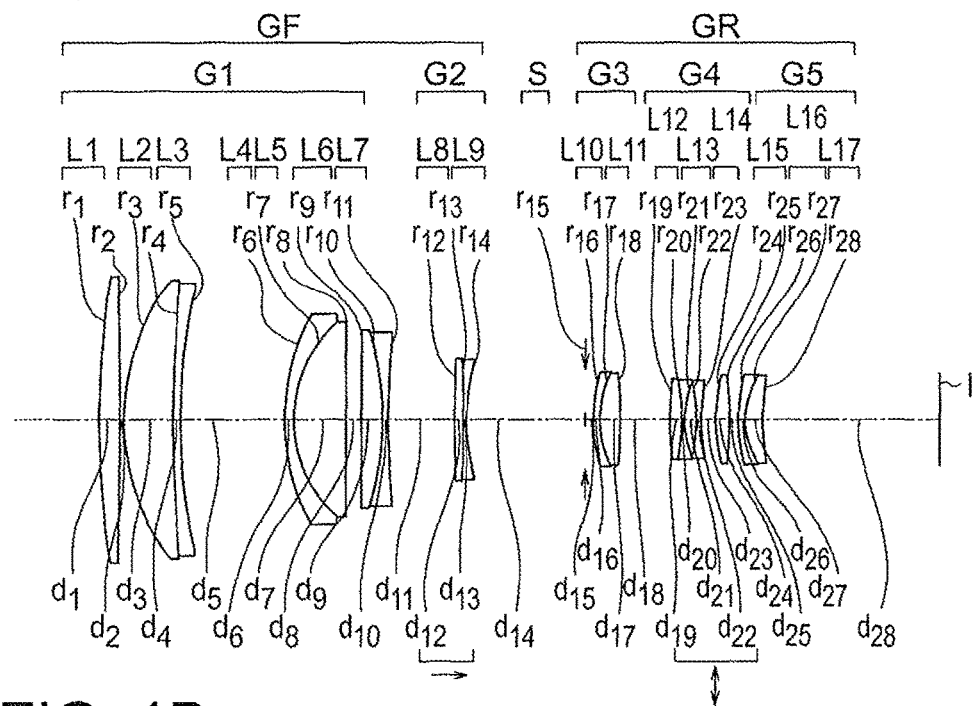
FIG. 1A and FIG. 1B are lens cross-sectional views at the time of focusing at an object at infinity of an image forming lens system according to the present invention, where.

Exemplary embodiments and examples of an image forming lens system and an image pickup apparatus using the same according to the present invention will be described below in detail by referring to the accompanying diagrams. However, the present invention is not restricted to the embodiments and the examples described below.

Prior to the description of the image forming lens system according to the present embodiment, a basic arrangement of the image forming lens system of the present embodiment will be described below. Moreover, in the following description, the 'image forming lens system' is appropriately referred to as a 'lens system'.

In the basic arrangement, the lens system includes in order from an object side to an image side along an optical axis, a front lens unit having a positive refractive power, and a rear lens unit, and the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit.

As aforementioned, the lens system includes in order from the object side to the image side, the front lens unit, and the rear lens unit. Here, the lens system does not include any other lens unit on the optical axis, or in other words, the lens system does not include a lens unit other than the front lens unit and the rear lens unit. Therefore, the lens units disposed on the optical axis are the front lens unit and the rear lens unit only. A cover glass and various optical filters, not being lens units, may be disposed on the optical axis (in an optical path).

For shortening the overall length of the lens system, it is necessary to arrange the lens system to include a telephoto arrangement, as well as to enhance an effect attributed to the telephoto arrangement (hereinafter, appropriately referred to as 'effect due to the telephoto arrangement'). For enhancing the effect due to the telephoto arrangement, it is preferable to dispose a lens unit having a positive refractive power nearest to the object, and to dispose a lens unit having a negative refractive power on the image side thereof. By making such an arrangement, correction of a spherical aberration, a coma, and an astigmatism becomes possible mainly, while enhancing the effect due to the telephoto arrangement.

Here, the front lens unit includes in order from the object side to the image side, the lens unit having a positive refractive power and the lens unit having a negative refractive power. Therefore, even in the lens system according to the present embodiment, since an effect due to a telephoto arrangement is enhanced, it is possible to shorten the overall length of the lens system. Moreover, by making such an arrangement, it is possible to correct mainly a spherical aberration, a coma, and an astigmatism favorably, while enhancing the effect due to the telephoto arrangement.

For enhancing the effect due to the telephoto arrangement in the front lens unit, it is preferable that each of the first lens unit and the second lens unit includes at least the positive lens and the negative lens. By making such an arrangement, it is possible to reduce the occurrence of aberrations such as the spherical aberration, the coma, the astigmatism, and the chromatic aberration in each of the first lens unit and the second lens unit. As a result, it is possible to achieve a favorable imaging performance even while small-sizing the lens system.

Moreover, by letting the second lens unit to be the focusing lens unit, the second lens unit has a focusing function and a function of enhancing an effect due to a telephoto arrangement. In such manner, by imparting two functions to one lens unit, it is possible to make the lens arrangement extremely simple. Accordingly, since it is possible to reduce the number of lenses in the lens system, it is possible to make the lens system light-weight.

By disposing at least the positive lens and the negative lens in the rear lens unit, it is possible to suppress the occurrence of the spherical aberration and the coma in the rear lens unit. As a result, a favorable imaging performance is achieved. Moreover, the positive lens and the negative lens are to be disposed regardless of order of disposing.

Moreover, by letting the second lens unit to be the focusing lens unit, the second lens unit becomes a lens unit that moves, in the front lens unit. Here, the lens unit is moved for zooming and for correcting image stabilization, apart from for focusing. As the lens unit is moved, an angle of incidence of alight ray that is incident on the lens changes with the movement of the lens unit. The change in the angle of incidence has an effect on a curvature of field and a chromatic aberration of magnification. For preventing deterioration of the curvature of field and the chromatic aberration of magnification, it is necessary to make small an amount of the curvature of field and the chromatic aberration of magnification that occur.

By letting the second lens unit to be the only lens unit that moves, in the front lens unit, no other lens unit which moves, other than the focusing lens unit, is disposed in the front lens unit. By making such an arrangement, since it is possible to reduce a necessity of taking into consideration the correction of the curvature of field and the chromatic aberration of magnification, it becomes possible to enhance further the effect due to the telephoto arrangement.

An image forming lens system according to a first embodiment will be described below. The image forming lens system according to the first embodiment includes in order from an object side to an image side along an optical axis, a front lens unit having a positive refractive power, and a rear lens unit, and the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the following conditional expressions (1) and (2') are satisfied:

$$0.5 < f_{FF}/f < 1.65 \quad (1)$$

$$0 \leq |f/r_{G2b}| < 6.5 \quad (2')$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object.

The image forming lens system according to the first embodiment has the abovementioned basic arrangement, and also conditional expressions (1) and (2') are satisfied. Since the technical significance of the basic arrangement has already been explained, description thereof is omitted here.

When falling below a lower limit value of conditional expression (1), the refractive power of the front lens unit becomes large. In this case, since the negative refractive power of the focusing lens unit becomes relatively small with respect to the positive refractive power of the first lens unit, an amount of movement of the focusing lens unit at the time of focusing increases. Therefore, when an attempt is made to secure a space which is necessary for the movement of the focusing lens unit, shortening the overall length of the lens system becomes difficult. Moreover, a weight of a focusing unit (an arrangement including the focusing lens unit and a moving mechanism) increases.

When exceeding an upper limit value of conditional expression (1), since the refractive power of the front lens unit becomes small, shortening the overall length of the lens system becomes difficult.

When exceeding an upper limit value of conditional expression (2'), an amount of occurrence of the spherical aberration and the coma increases at a lens surface immediately before the object side of the second lens unit. Since an effect of correction of these aberrations affect the second lens unit, it is not possible to secure a stable imaging performance at the time of focusing. Moreover, the lens surface on the object side of the second lens unit, immediately before the second lens unit, is a lens surface which is positioned on the object side of the second lens unit, and is a lens surface which is positioned nearest to the second lens unit.

An image forming lens system according to a second embodiment includes in order from an object side to an image side along an optical axis, a front lens unit having a positive refractive power, and a rear lens unit, and the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the following conditional expressions (2) and (3) are satisfied:

$$0 \leq |f/r_{G2b}| < 7.0 \quad (2)$$

$$0.27 < |f_{fo}|/f < 0.6 \quad (3)$$

where, f denotes a focal length of the image forming lens system at the time of focusing at an object at infinity, $r_{G2b}$ denotes a paraxial radius of curvature of a lens surface on the object side of the second lens unit, immediately before the object, and $f_{fo}$ denotes a focal length of the second lens unit.

The image forming lens system according to the second embodiment has the abovementioned basic arrangement, and also conditional expressions (2) and (3) are satisfied. Since the technical significance of the basic arrangement has already been explained, description thereof is omitted here. Moreover, a technical significance of conditional expression (2) is same as the technical significance of conditional expression (2').

When falling below a lower limit value of conditional expression (3), an amount of a spherical aberration and a coma that occur increases. Since an effect of correction of the spherical aberration and the coma is induced on the second lens unit, it is not possible to secure a stable imaging performance at the time of focusing. Or, when an attempt is made to correct the spherical aberration and the coma for securing a focusing performance sufficiently at the time of focusing, it leads to an increase in the number of lenses that form the focusing lens unit. As a result, making the focusing lens unit light-weight cannot be facilitated.

When exceeding an upper limit value of conditional expression (3), the effect due to the telephoto arrangement is weakened. Therefore, shortening the overall length of the lens system becomes difficult.

An image forming lens system according to a third embodiment includes in order from an object side to an image side along an optical axis, a front lens unit having a positive refractive power, and a rear lens unit, and the image forming lens system does not include any other lens unit on the optical axis, and the front lens unit includes in order from the object side to the image side, a first lens unit having a positive refractive power and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the focusing lens unit includes two lenses, and the following conditional expressions (2) and (3') are satisfied:

$$0 \leq |f/r_{G2b}| < 7.0 \quad (2)$$

$$0.12 < |f_{fo}|/f < 0.4 \quad (3')$$

where, f denotes a focal length of the image forming lens system at the time of focusing at an object at infinity, $r_{G2b}$ denotes a paraxial radius of curvature of a lens surface on the object side of the second lens unit, immediately before the object, and $f_{fo}$ denotes a focal length of the second lens unit.

The image forming lens system according to the third embodiment has the abovementioned basic arrangement, and also conditional expressions (2) and (3') are satisfied. Since the technical significance of the basic arrangement and the technical significance of conditional expression (2) have already been explained, description thereof is omitted here. Moreover, a technical significance of conditional expression (3') is same as the technical significance of conditional expression (3).

Moreover, in the image forming lens system according to the third embodiment, the focusing lens unit includes two lenses.

In the basic arrangement according to the present embodiment, as aforementioned, it is possible to correct the spherical aberration, the coma, and the astigmatism favorably in the front lens unit. Therefore, by disposing the focusing lens unit in the rear lens unit, it is possible to improve stability of focusing performance. Moreover, with the improvement in the stability of focusing performance, even if the focusing lens unit is formed by a small number of lenses, not more than two, securing improved focusing performance and making the focusing lens unit light-weight are possible.

Moreover, it is preferable that the image forming lens systems according to the first embodiment, the second embodiment, and the third embodiment (hereinafter, appropriately called as 'the lens system according to the present embodiment') include an aperture stop which is disposed on the image side of the second lens unit.

By making such an arrangement, it is possible to make a lens diameter small in a lens unit on the image side of the aperture stop. Particularly, it is preferable to make the positive refractive power of the first lens unit and the negative refractive power of the second lens unit large, and to dispose the aperture stop on the image side of the second lens unit. By making such an arrangement, it is possible to make a lens diameter further smaller in the lens units on the image side of the aperture stop.

Moreover, in the lens system according to the present embodiment, it is preferable that the second lens unit is a lens unit which is disposed nearest to the image, in the front lens unit, and the aperture stop is included in the rear lens unit.

In the front lens unit, it is desirable to impart a positive refractive power to the overall front lens unit while enhancing the effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Here, by disposing the aperture stop in the rear lens unit, it is possible to make a lens diameter further smaller in a lens system on the image side of the aperture stop.

Moreover, in the lens system according to the present embodiment, it is preferable that the front lens unit includes two lens units namely, the first lens unit and the second lens unit.

For shortening the overall length of the lens system, it is necessary to arrange the lens system to include a telephoto arrangement, as well as to enhance an effect due to the telephoto arrangement. For enhancing the effect due to the telephoto arrangement, it is preferable to dispose a lens unit having a positive refractive power nearest to the object, and to dispose a lens unit having a negative refractive power on the image side thereof. By making such an arrangement, correction of the spherical aberration, the coma and the astigmatism becomes possible mainly, while enhancing the effect due to the telephoto arrangement.

Here, as aforementioned, the front lens unit includes in order from the object side to the image side, the lens unit having a positive refractive power and the lens unit having a negative refractive power. Therefore, even in the lens unit according to the present embodiment, since the effect due to the telephoto arrangement has been enhanced, it is possible to shorten the overall length of the lens system. Moreover, by making such an arrangement, it is possible to correct favorably mainly the spherical aberration, the coma, and the astigmatism, while enhancing the effect due to the telephoto arrangement.

More specifically, a lens unit having a positive refractive power is let to be the first lens unit, a lens unit having a negative refractive power is let to be the second lens unit, and the front lens unit includes only two lens units. By making such an arrangement, it is possible to shorten the overall length of the front lens unit.

Moreover, in the lens system according to the present embodiment, the following conditional expression (4) is satisfied:

$$0.03 < f_b/f < 0.25 \quad (4)$$

where, $f_b$ denotes a distance along the optical axis from an image-side surface of a lens nearest to an image, of the image forming lens system up to an image plane, at the time of focusing at an object at infinity, and $f$ denotes a focal length of the image forming lens system at the time of focusing at an object at infinity.

In a case of facilitating shortening of the overall length of the optical system by enhancing the effect due to the telephoto arrangement, it is desirable that the front lens unit has a positive refractive power. Moreover, in the rear lens unit, it is necessary to correct the spherical aberration and the coma remained in the front lens unit. An effect of correction of these aberrations depends on a distance between refracting surfaces in the rear lens unit. Therefore, it is necessary to secure appropriately the distance between the refracting surfaces for enhancing the effect of correction of aberrations.

When falling below a lower limit value of conditional expression (4), since a back focus becomes short, a diameter of a lens disposed near an image plane becomes large. Therefore, falling below the lower limit value of conditional expression (2) is not preferable for making the optical system light-weight.

When exceeding an upper limit value of conditional expression (4), it is not possible to secure sufficiently the distance between the refracting surfaces in the rear lens unit. Therefore, when an attempt is made to shorten the overall length of the optical system, an amount of the spherical aberration and the coma that occur, increases. As a result of this, a favorable imaging performance is not achieved.

Moreover, in the lens system according to the present embodiment, it is preferable that the rear lens unit includes an image-motion correcting lens unit, and the image-motion correcting lens unit moves in a direction different from a direction of the optical axis to reduce an image motion due to shaking of the image forming lens system.

By shifting a lens unit having a refractive power, it is possible to correct a shift in an imaging position caused due to camera shake. Here, shifting the lens unit means moving the lens unit in the direction different from the direction of the optical axis to reduce an image motion due to shaking of the lens system. It is desirable that the lens unit which is to be shifted is small-sized and light-weight.

In a lens system having a telephoto arrangement, the rear lens unit becomes a lens unit having the smallest lens diameter. Therefore, since the lens system according to the present embodiment adopts the telephoto arrangement, it is preferable to dispose the lens unit to be shifted, or in other words, the image-motion correcting lens unit, in the rear lens unit. By making such an arrangement, since it is possible to make the image-motion correcting lens unit small-sized and light-weight, it is possible to improve a response of the image-motion correction.

Moreover, in the lens system according to the present embodiment, it is preferable that the rear lens unit includes a first predetermined lens unit which is disposed immediately before the image-motion correcting lens unit, and the first predetermined lens unit has a refractive power having a sign different from a sign of a refractive power of the image-motion correcting lens unit.

By making such an arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carry out image-motion correction of higher accuracy with a small amount of shift.

Moreover, in the lens system according to the present embodiment, it is preferable that the rear lens unit includes a second predetermined lens unit which is disposed immediately after the image-motion correcting lens unit, and the second predetermined lens unit has a refractive power having a sign different from a sign of the refractive power of the image-motion correcting lens unit.

By making such an arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carry out image-motion correction of higher accuracy with a small amount of shift.

Moreover, in the lens system according to the present embodiment, it is preferable that the image-motion correcting lens unit includes a plurality of lenses and a predetermined lens, and the plurality of lenses have a refractive power having a sign same as the sign of the refractive power of the image-motion correcting lens unit, and the predetermined lens has a refractive power having a sign different from the sign of the refractive power of the image-motion correcting lens unit.

Aberrations which occur when there is a shaking are mainly, the spherical aberration, a curvature of field, and a chromatic aberration of magnification. For reducing degradation of correction performance with respect to the shaking, it is necessary to reduce an amount of the aberrations which occur. Here, in the image-motion correcting lens unit, since a proportion of load of the refractive power being large (the refractive power being large), the aberration is susceptible to occur.

Therefore, the image-motion correcting lens unit is formed by the plurality of lenses and the predetermined lens. Moreover, by the plurality of lenses having the refractive power having a sign same as the sign of the refractive power of the image-motion correcting lens unit, it is possible to reduce occurrence of the spherical aberration and the curvature of field. Furthermore, by the predetermined lens having the refractive power having a sign different from the sign of the refractive power of the image-motion correcting lens unit, it is possible to correct the chromatic aberration favorably.

Furthermore, it is desirable to let the number of the plurality of lenses to be two and the number of the predetermined lenses to be one, and to form the image-motion correcting lens unit by a total of three lenses.

Moreover, in the lens system according to the present embodiment, it is preferable that the rear lens unit includes a first predetermined lens unit which is disposed immediately before the image-motion correcting lens unit, and a second predetermined lens unit which is disposed immediately after the image-motion correcting lens unit, and each of the first predetermined lens unit and the second predetermined lens unit has a refractive power having a sign different from the sign of the refractive power of the image-motion correcting lens unit.

By making such an arrangement, it is possible to make the refractive power of the image-motion correcting lens unit further larger, while suppressing the occurrence of aberration. As a result, it is possible to make the amount of shift in the imaging position further larger with respect to the amount of shift in the image-motion correcting lens unit. Accordingly, it is possible to carry out image-motion correction of higher accuracy with a small amount of shift.

Moreover, in the lens system according to the present embodiment, it is preferable that the image-motion correcting lens unit has a negative refractive power.

In the image-motion correction, the image-motion correcting lens unit is shifted. For the image-motion correction, it is preferable to make the amount of movement of the image-motion correcting lens unit small (to narrow a range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Moreover, in the lens system according to the present embodiment, it is preferable that the rear lens unit includes in order from the object side, a lens unit having a positive refractive power, an image-motion correcting lens unit having a negative refractive power, and a lens unit having a positive refractive power.

The focusing lens unit is disposed in the front lens unit. It is preferable to let the refractive power of the focusing lens unit to be a negative refractive power, and to dispose a lens unit having a positive refractive power on the image side of the focusing lens unit. By making such an arrangement, since a magnification of the focusing lens unit is enhanced, it is possible to improve a focusing sensitivity more easily. Accordingly, since it is possible to reduce an amount of movement of the focusing lens unit at the time of focusing, it is possible to make a focusing speed high.

Moreover, in the image-motion correction, the image-motion correcting lens unit is shifted. For the image-motion correction, it is preferable to make the amount of movement of the image-motion correcting lens unit small (to narrow the range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Moreover, a lens unit having a positive refractive power is disposed on the object side of the image-motion correcting lens unit, and a lens unit having a positive refractive power is disposed on the image side of the image-motion correcting lens unit. By making such an arrangement, it is possible to make the refractive power of the image-motion correcting lens unit large. As a result, it is possible to make an amount of shift in the imaging position large with respect to an amount of shift of the image-motion correcting unit. Accordingly, it is possible to carry out image-motion correction of higher accuracy with a small amount of shift.

Meanwhile, the coma occurs due to shifting of the image-motion correcting lens unit. Therefore, if the focusing lens unit is disposed on the image side of the image-motion correcting lens unit, an effect of correction of the coma fluctuates substantially due to focusing. Therefore, it is not preferable to dispose the focusing lens unit on the image side of the image-motion correcting lens unit.

Moreover, the lens unit having a positive refractive power which is disposed on the object side of the image-motion correcting lens unit is also the positive lens unit disposed on the image side of the focusing lens unit. In such manner, when the lens unit disposed on the object side of the image-motion correcting lens unit and the lens unit disposed on the image side of the focusing lens unit are let to be common, it is possible to make an optical lay out of the rear lens unit simple.

Moreover, by disposing all the lens units in the rear lens unit on the image side of the aperture stop, it is possible to make the diameter of the rear lens unit even smaller.

Moreover, it is preferable that the lens system according to the present embodiment includes an aperture stop, and a lens unit having a positive refractive power which is disposed on the object side of the image-motion correcting lens unit, immediately before the image-motion correcting lens unit, and positions of both the aperture stop and the lens unit having a positive refractive power are fixed.

It is possible to make a lens diameter small on the image side of the aperture stop. When the lens unit having a positive refractive power is disposed on the object side of the image-motion correcting lens unit, immediately before the image-motion correcting lens unit, the lens unit having a positive refractive power is a lens unit disposed nearest to the object, in the rear lens unit. Therefore, it is possible to make large the number of lens units of which, a lens diameter can be made small. As a result of this, it is possible to make small a diameter of the optical system.

Moreover, by letting the lens unit having a positive refractive power to be fixed all the time, it is possible to reduce the number of lenses that are to be moved. Accordingly, it is possible to make a lens unit to be moved at the time of focusing light-weight.

Moreover, in the lens system according to the present embodiment, it is preferable that only the second lens unit which is the focusing lens unit is a lens unit that is movable in an optical axial direction.

By letting only the focusing lens unit to be a lens unit which is movable in the optical axial direction, it is possible to reduce the number of lenses which are to be moved. Accordingly, it is possible to make a lens unit which is to be moved at the time of focusing light-weight.

Moreover, in the lens system according to the present embodiment, it is preferable that only the image-motion correcting lens unit and the second lens unit which is the focusing lens unit are lens units that are movable.

By letting only the focusing lens unit and the image-motion correcting lens unit to be movable lens units, it is possible to reduce the number of lenses to be moved. Accordingly, it is possible to make a lens unit to be moved at the time of focusing or at the time of image-motion correction light-weight.

Moreover, in the lens system according to the present embodiment, it is preferable that the second lens unit is a lens unit which is disposed nearest to an image, in the front lens unit.

By making such an arrangement, the front lens unit includes two lens units namely the first lens unit and the second lens unit. As a result of this, it is possible to shorten the overall length of the front lens unit.

Moreover, in the lens system according to the present embodiment, it is preferable to include an image-motion correcting lens unit which satisfies the following conditional expression (5):

$$0.8<|MG_{ISback} \times (MG_{IS}-1)|<5.0 \qquad (5)$$

where, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

When falling below a lower limit value of conditional expression (5), an effect of image-motion correction by shifting the image-motion correcting lens unit is not achieved sufficiently. When exceeding an upper limit value of conditional expression (5), since a proportion of load of the refractive power on the image-motion correcting lens unit becomes large, degradation of the correction performance with respect to the shaking becomes large.

Moreover, in the lens system according to the present embodiment, it is preferable that the focusing lens unit satisfies the following conditional expression (6):

$$1.5<|(MG_{foback})^2 \times \{(MG_{fo})^2-1\}|<8.0 \qquad (6)$$

where, $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

When falling below a lower limit value of conditional expression (6), since the amount of movement of the focusing lens unit become excessively large, shortening the overall length of the lens system becomes difficult. When exceeding an upper limit value of conditional expression (6), since a position control of the focusing lens unit becomes difficult, it is not possible to carry out an accurate focusing.

Moreover, in the lens system according to the present embodiment, it is preferable that the front lens unit has a positive refractive power, and the second lens unit has a negative refractive power, and the following conditional expression (7) is satisfied:

$$-5.0<f_{FF}/f_{fo}<-1.0 \qquad (7)$$

where, $f_{FF}$ denotes a focal length of the front lens unit at the time of focusing at an object at infinity, and $f_{fo}$ denotes the focal length of the second lens unit.

By letting the refractive power of the front lens unit to be a positive refractive power, and the refractive power of the focusing lens unit to be a negative refractive power, since it is possible to enhance the effect due to the telephoto arrangement in the overall lens system, shortening the overall length of the lens system becomes possible.

When falling below a lower limit value of conditional expression (7), the refractive power of the focusing lens unit becomes excessively large. In this case, since the spherical aberration which occurs in the focusing lens unit increases, a favorable imaging performance is not achieved in the overall focusing range.

When exceeding an upper limit value of conditional expression (7), the refractive power of the focusing lens unit becomes excessively small. In this case, since the focusing sensitivity is degraded, the amount of movement of the focusing lens unit at the time of focusing increases. As a result, shortening the overall length of the lens system becomes difficult.

Moreover, in the lens unit according to the present embodiment, it is preferable that the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and the 1-1$^{th}$ sub lens unit has a positive refractive power, and each of the 1-1$^{th}$ sub lens unit and the 1-2$^{th}$ sub lens unit includes a positive lens and a negative lens, and the following conditional expression (8) is satisfied:

$$0.35<D_{G1}/f_{G1}<1.3 \qquad (8)$$

where, $D_{G1}$ denotes a distance on the optical axis from a lens surface nearest to an object of the first lens unit up to a lens surface nearest to an image of the first lens unit, and $f_{G1}$ denotes the focal length of the first lens unit.

For enhancing the effect due to the telephoto arrangement in the front lens unit, it is necessary to make the positive refractive power of the first lens unit large. However, when such an arrangement is made, a curve of the spherical aberration (an amount of the spherical aberration that occurs) becomes large. Therefore, the positive refractive power of the first lens unit is divided between the 1-1$^{th}$ sub lens unit and the 1-2$^{th}$ sub lens unit. By making such an arrangement, even if the refractive power of the first lens unit is made large, it is possible to make an arrangement of the first lens unit an arrangement in which, the curve of the spherical aberration is small. Furthermore, an arrangement is let to be such that each of the 1-1$^{th}$ sub lens unit and the 1-2$^{th}$ sub lens unit includes the positive lens and the negative lens. By making such an arrangement, it is possible to reduce a curve of the chromatic aberration (an amount of the chromatic aberration that occurs) in the first lens unit.

It is possible to let only the 1-1$^{th}$ sub lens unit bear the positive refractive power of the first lens unit, and to let the refractive power of the 1-2$^{th}$ sub lens unit to be a negative refractive power. By making such an arrangement, it is possible to make an arrangement of the first lens unit to be the telephoto arrangement. Letting the refractive power of the 1-2$^{th}$ sub lens unit to be a negative refractive power is advantageous for shortening the overall length of the lens system.

When falling below a lower limit value of conditional expression (8), a lens diameter in the 1-2$^{th}$ sub lens unit becomes large. Therefore, making the overall lens system light-weight cannot be facilitated. Furthermore, since the curve of the spherical aberration increases, securing a favorable imaging performance becomes difficult.

When exceeding an upper limit value of conditional expression (8), shortening the overall length of the lens system becomes difficult.

Moreover, in the lens system according to the present embodiment, it is preferable that the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and the 1-1$^{th}$ sub lens unit has a positive refractive power, and each of the 1-1$^{th}$ sub lens unit and the 1-2$^{th}$ sub lens unit includes a positive lens and a negative lens, and the following conditional expression (9) is satisfied:

$$0.1 < D_{G112}/f_{G1} < 0.6 \quad (9)$$

where, $D_{G112}$ denotes a distance on the optical axis between the 1-1$^{th}$ sub lens unit and the 1-2$^{th}$ sub lens unit, and $f_{G1}$ denotes the focal length of the first lens unit.

For enhancing the effect due to the telephoto arrangement in the front lens unit, it is necessary to make the positive refractive power of the first lens unit large. However, when such an arrangement is made, the curve of the spherical aberration (an amount of the spherical aberration that occurs) becomes large. Therefore, the positive refractive power of the first lens unit is divided between the 1-1$^{th}$ sub lens unit and the 1-2$^{th}$ sub lens unit. By making such an arrangement, even if the refractive power of the first lens unit is made large, it is possible to make the arrangement of the first lens unit an arrangement in which, the curve of the spherical aberration is small. Furthermore, an arrangement is let to be such that each of the 1-1$^{th}$ sub lens unit and the 1-2$^{th}$ sub lens unit includes the positive lens and the negative lens. By making such an arrangement, it is possible to reduce the curve of the chromatic aberration (an amount of the chromatic aberration that occurs) in the first lens unit.

It is possible to let only the 1-1th sub lens unit bear the positive refractive power of the first lens unit, and to let the refractive power of the 1-2th sub lens unit to be a negative refractive power. By making such an arrangement, it is possible to make an arrangement of the first lens unit to be the telephoto arrangement. Letting the refractive power of the 1-2$^{th}$ sub lens unit to be a negative refractive power is advantageous for shortening the overall length of the lens system.

When falling below a lower limit value of conditional expression (9), a lens diameter in the 1-2$^{th}$ sub lens unit becomes large. Therefore, making the overall lens system light-weight cannot be facilitated. Furthermore, since the curve of the spherical aberration increases, securing a favorable imaging performance becomes difficult.

When exceeding an upper limit value of conditional expression (9), shortening the overall length of the lens system becomes difficult.

Moreover, in the lens system according to the present embodiment, it is preferable that the front lens unit includes a first lens unit and a second lens unit, and the following conditional expression (10) is satisfied:

$$0.31 < |f_{G1}/f_{fi}| < 3.0 \quad (10)$$

where, $f_{G1}$ denotes the focal length of the first lens unit, and $f_{fo}$ denotes the focal length of the second lens unit.

When falling below a lower limit value of conditional expression (10), it is advantageous for shortening the overall length of the lens system, but the refractive power of the first lens unit with a large aperture becomes excessively large. In this case, since a proportion of the refractive power of the first lens unit with respect to the refractive power of the overall lens system becomes large, it becomes difficult to make the overall lens system light-weight.

When exceeding an upper limit value of conditional expression (10), the refractive power of the second lens unit becomes excessively large. In this case, since a proportion of the refractive power of the second lens unit with respect to the refractive power of the overall lens system becomes large, shortening the overall length of the lens system becomes difficult.

Moreover, in the lens system according to the present embodiment, it is preferable that the rear lens unit includes an aperture stop, and the aperture stop is disposed on the object side of any lens in the rear lens unit.

By making such an arrangement, it is possible to make a lens diameter small in a lens unit on the image side of the aperture stop.

Moreover, in the lens system according to the present embodiment, it is preferable that the rear lens unit includes in order from the object side to the image side, a lens unit having a positive refractive power, a lens unit having a negative refractive power, and a lens unit having a positive refractive power, and the lens unit having a positive refractive power positioned on the object side of the lens unit having a negative refractive power in the rear lens unit includes two sub lens units having a positive refractive power, and the aperture stop is disposed to be sandwiched between the two sub lens units.

It is desirable to impart the positive refractive power to the overall front lens unit while enhancing the effect due to the telephoto arrangement in the front lens unit. Accordingly, since it is possible to reduce a proportion of load of refractive power on the rear lens unit, it is possible to shorten the overall length of the lens system as well as to reduce an aberration that occurs in the rear lens unit. As a result of this, it is possible to secure a favorable imaging performance.

Here, by making the positive refractive power of the front lens unit large, and by disposing the aperture stop immediately after the front lens unit, it is possible to make a lens diameter small in a lens unit that is positioned on the image side of a diaphragm.

By disposing the aperture stop to be sandwiched between the two sub lens units, a lens unit having a positive refractive power is positioned on the object side of the aperture stop. Therefore, it is possible to make a diameter of the aperture stop small.

Moreover, it is preferable that the sub lens unit which is disposed on the object side of the aperture stop includes one lens. By making such an arrangement, it is possible to make the sub lens unit light-weight.

Moreover, it is preferable that the image forming lens system according to the present invention includes an aperture stop, and a lens unit having a positive refractive power, which is disposed on the object side of the image-motion correcting lens unit, immediately before the image-motion correcting lens unit, and the aperture stop is disposed in the lens unit having a positive refractive power.

It is possible to make a lens diameter small on the image side of the aperture stop. By making such an arrangement, it is possible to make large the number of lens units of which, a lens diameter can be made small.

Moreover, in the lens system according to the present embodiment, it is preferable that the rear lens unit includes a positive lens and a negative lens.

By disposing at least the positive lens and the negative lens in the rear lens unit, it is possible to suppress the occurrence of the spherical aberration and the coma in the rear lens unit. As a result, a favorable imaging performance is achieved. Moreover, the positive lens and the negative lens are to be disposed regardless of order of disposing.

By the way, the aperture stop can be deemed as one of the components that forms the rear lens unit, and can be deemed as a component that is independent of the front lens unit and the rear lens unit. In the latter case, the aperture stop becomes a component which forms the diaphragm unit.

Moreover, in the lens system according to the present embodiment, it is preferable that the diaphragm unit does not include a lens.

By making such an arrangement, it is possible to reduce an effect of a manufacturing error (tilt and shift) between the front lens unit and the rear lens unit.

Moreover, in the lens system according to the present embodiment, it is preferable that the diaphragm unit does not include a lens, and is disposed nearest to the object side of the rear lens unit.

By making such an arrangement, it is possible to reduce an effect of a manufacturing error (tilt and shift) between the front lens unit and the rear lens unit.

Moreover, in the lens system according to the present embodiment, it is preferable that the diaphragm unit is disposed on the image side of the focusing lens unit.

In the front lens unit, it is desirable to impart a positive refractive power to the overall front lens unit while enhancing an effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Therefore, in a case in which, the diaphragm unit is let to be an independent component, it is preferable that the diaphragm unit is disposed nearest to the object side of the rear lens unit. Or, it is preferable that the diaphragm unit is disposed immediately after the front lens unit. By making such an arrangement, it is possible to make a diameter small in a lens unit on the image side of the diaphragm unit (aperture stop).

Moreover, in the lens system according to the present embodiment, it is preferable that the diaphragm unit is disposed immediately after the front lens unit.

In the front lens unit, it is desirable to impart a positive refractive power to the overall front lens unit while enhancing an effect due to the telephoto arrangement. Accordingly, since it is possible to reduce a proportion of load of the refractive power in the rear lens unit, it is possible to shorten the overall length of the lens system as well as to reduce an aberration which occurs in the rear lens unit. As a result, it is possible to secure a favorable imaging performance.

Here, it is preferable that the diaphragm unit is disposed immediately after the front lens unit. By making such an arrangement, it is possible to make a diameter small in a lens unit on the image side of the diaphragm unit (aperture stop).

Moreover, an image pickup apparatus according to the present embodiment includes an optical system, and an image pickup element which has an image pickup surface, and which converts an image formed on the image pickup surface by the optical system to an electric signal, and the optical system is one of the image forming lens systems according to the aforementioned embodiments.

It is possible to realize an image pickup apparatus which has a superior mobility, and which is capable of carrying out photography with high resolution.

It is preferable that a plurality of abovementioned arrangements is satisfied simultaneously.

Moreover, for each conditional expression, it is preferable to restrict both or one of the upper limit value and the lower limit value, as it enables to have that function more assuredly.

For conditional expression (1), it is more preferable to let the lower limit value to be 0.6.

Moreover, for conditional expression (1), it is more preferable to let the upper limit value to be 1.5.

For conditional expression (2), it is more preferable to let the upper limit value to be 6.4. For conditional expression (2), it is even more preferable to let the upper limit value to be 4.0, and 2.0 is all the more preferable.

For conditional expression (2'), it is more preferable to let the upper limit value to be 4.0, and 2.0 is even more preferable.

For conditional expression (3), it is more preferable to let the lower limit value to be 0.2.

Moreover, for conditional expression (3), it is more preferable to let the upper limit value to be 0.45, and 0.4 is even more preferable.

For conditional expression (3'), it is more preferable to let the lower limit value to be 0.2, and 0.27 is even more preferable.

For conditional expression (4), it is more preferable to let the lower limit value to be 0.05.

Moreover, for conditional expression (4), it is more preferable to let the upper limit value to be 0.2.

For conditional expression (5), it is more preferable to let the lower limit value to be 1.3.

Moreover, for conditional expression (5), it is more preferable to let the upper limit value to be 3.5.

For conditional expression (6), it is more preferable to let the lower limit value to be 2.5.

Moreover, for conditional expression (6), it is more preferable to let the upper limit value to be 6.5.

For conditional expression (7), it is more preferable to let the lower limit value to be −4.5, and −3.5 is even more preferable.

Moreover, for conditional expression (7), it is more preferable to let the upper limit value to be −1.2, and −1.5 is even more preferable.

For conditional expression (10), it is more preferable to let the lower limit value to be 0.35.

Moreover, for conditional expression (10), it is more preferable to let the upper limit value to be 1.0.

Moreover, the aforementioned image forming lens system and the image pickup apparatus may satisfy the plurality of arrangements simultaneously. Making such an arrangement is preferable for achieving a favorable image forming lens system and an image pickup apparatus. Moreover, combinations of preferable arrangements are arbitrary. Moreover, for each conditional expression, only an upper limit value or a lower limit value of a numerical range of a conditional expression further restricted may be restricted.

Examples of the image forming lens system according to the present invention will be described below in detail by referring to the accompanying diagrams. However, the present invention is not restricted to the examples described below.

Examples from an example 1 to an example 5 of an image forming lens system according to the present invention will be described below. Lens cross-sectional views at the time of focusing at an object at infinity of the examples from the example 1 to the example 5 are shown in FIG. 1A, FIG. 1B, FIG. 2A, FIG. 2B, and FIG. 3.

In these lens cross-sectional views, a first lens unit is denoted by G1, a second lens unit is denoted by G2, an aperture stop is denoted by S, a third lens unit is denoted by G3, a fourth lens unit is denoted by G4, a fifth lens unit is denoted by G5, and an image plane is denoted by I. Moreover, although it is not shown in the diagrams, a parallel flat plate which forms a low-pass filter, and a cover glass of an electronic image pickup element, may be disposed between the last lens unit and the image plane I. A wavelength region restricting coating, which restricts infrared light, may be applied on a surface of the parallel flat plate. Moreover, a multilayer film for restricting a wavelength region may be formed on a surface of the cover glass. Furthermore, an arrangement may be made to impart a low-pass filter effect to the cover glass. Moreover, an image pickup element may be disposed on the image plane I.

In each example, an image forming lens system includes in order from an object side to an image side, a front lens unit GF and a rear lens unit GR. Here, the rear lens unit GR includes an aperture stop S. However, an image forming lens system may be arranged to include in order from the object side to the image side, a front lens unit GF, a diaphragm unit, and a rear lens unit GR.

An image forming lens system according to the example 1, as shown in FIG. 1A, includes in order from an object side to an image side, a front lens unit GF having a positive refractive power and a rear lens unit GR having a positive refractive power. The rear lens unit GR includes an apertures stop. Here, r15 is the aperture stop, and there is no virtual surface.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, and a fifth lens unit G5 having a positive refractive power.

The first lens unit G1 includes a biconvex positive lens L1, a positive meniscus lens L2 having a convex surface directed toward the object side, a negative meniscus lens L3 having a convex surface directed toward the object side, a negative meniscus lens L4 having a convex surface directed toward the object side, a biconvex positive lens L5, a biconvex positive lens L6, and a biconcave negative lens L7. Here, the positive meniscus lens L2 and the negative meniscus lens L3 are cemented. Moreover, the negative meniscus lens L4 and the positive meniscus lens L5 are cemented. Furthermore, the biconvex positive lens L6 and the biconcave negative lens L7 are cemented.

Moreover, a $1\text{-}1^{th}$ sub lens unit includes the biconvex positive lens L1, the positive meniscus lens L2, and the negative meniscus lens L3. A $1\text{-}2^{th}$ sub lens unit includes the negative meniscus lens L4, the biconvex positive lens L5, the biconvex positive lens L6, and the biconcave negative lens L7. The $1\text{-}1^{th}$ sub lens unit has a positive refractive power and the $1\text{-}2^{th}$ sub lens unit has a negative refractive power.

The second lens unit G2 includes a biconvex positive lens L8 and a biconcave negative lens L9. Here, the biconvex positive lens L8 and the biconcave negative lens L9 are cemented. The second lens unit G2 is a focusing lens unit, and moves toward the image side along an optical axis at the time of focusing from an object at infinity to an object at a close distance.

The third lens unit G3 includes a negative meniscus lens L10 having a convex surface directed toward the object side and a biconvex positive lens L11. Here, the negative meniscus lens L10 and the biconvex positive lens L11 are cemented.

The fourth lens unit G4 includes a biconvex positive lens L12, a biconcave negative lens L13, and a biconcave negative lens L14. Here, the biconvex positive lens L12 and the biconcave negative lens L13 are cemented. The fourth lens unit G4 is an image-motion correcting lens unit, and moves in a direction different from an optical axial direction, such as a direction orthogonal to the optical axis, at the time of correcting image motion.

The fifth lens unit G5 includes a biconvex positive lens L15, a negative meniscus lens L16 having a convex surface directed toward the object side, and a positive meniscus lens L17 having a convex surface directed toward the object side. Here, the negative meniscus lens L16 and the positive meniscus lens L17 are cemented.

Figure 1B:
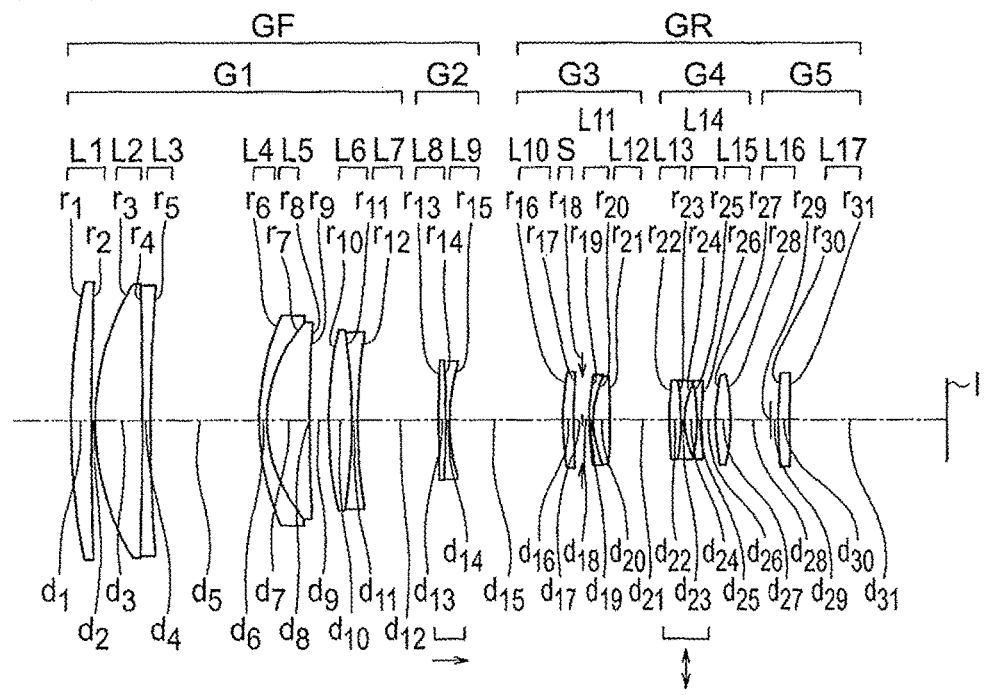

An image forming lens system according to the example 2, as shown in FIG. 1B, includes in order from an object side to an image side, a front lens unit GF having a positive refractive power and a rear lens unit GR having a positive refractive power. The rear lens unit GR includes an aperture stop. Here, r18 is the aperture stop, and r9 and r29 are virtual surfaces.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, and a fifth lens unit G5 having a positive refractive power.

The first lens unit G1 includes a positive meniscus lens L1 having a convex surface directed toward the object side, a biconvex positive lens L2, a biconcave negative lens L3, a negative meniscus lens L4 having a convex surface directed toward the object side, a positive meniscus lens L5 having a convex surface directed toward the object side, a biconvex positive lens L6, and a biconcave negative lens L7. Here, the biconvex positive lens L2 and the biconcave negative lens L3 are cemented. Moreover, the negative meniscus lens L4 and the positive meniscus lens L5 are cemented. Furthermore, the biconvex positive lens L6 and the biconcave negative lens L7 are cemented.

Moreover, a $1\text{-}1^{th}$ sub lens unit includes the positive meniscus lens L1, the biconvex positive lens L2, and the biconcave negative lens L3. A $1\text{-}2^{th}$ sub lens unit includes the negative meniscus lens L4, the positive meniscus lens L5, the biconvex positive lens L6, and the biconcave negative lens L7. The $1\text{-}1^{th}$ sub lens unit has a positive refractive power and the $1\text{-}2^{th}$ sub lens unit has a negative refractive power.

The second lens unit G2 includes a biconvex positive lens L8 and a biconcave negative lens L9. Here, the biconvex positive lens L8 and the biconcave negative lens L9 are cemented. The second lens unit G2 is a focusing lens unit, and moves toward the image side along an optical axis, at the time of focusing from an object at infinity to an object at a close distance.

The third lens unit G3 includes a positive meniscus lens L10 having a convex surface directed toward the object side, a negative meniscus lens L11 having a convex surface directed toward the object side, and a biconvex positive lens L12. Here, the negative meniscus lens L11 and the biconvex positive lens L12 are cemented. An aperture stop S is disposed between the positive meniscus lens L10 and the negative meniscus lens L11.

The fourth lens unit G4 includes a biconvex positive lens L13, a biconcave negative lens L14, and a biconcave negative lens L15. Here, the biconvex positive lens L13 and the biconcave negative lens L14 are cemented. The fourth lens unit G4 is an image-motion correcting lens unit, and moves in a direction different from an optical axial direction, such as a direction orthogonal to the optical axis, at the time of correcting image motion.

The fifth lens unit G5 includes a biconvex positive lens L16 and a positive meniscus lens L17 having a convex surface directed toward the object side.

Figure 2A:
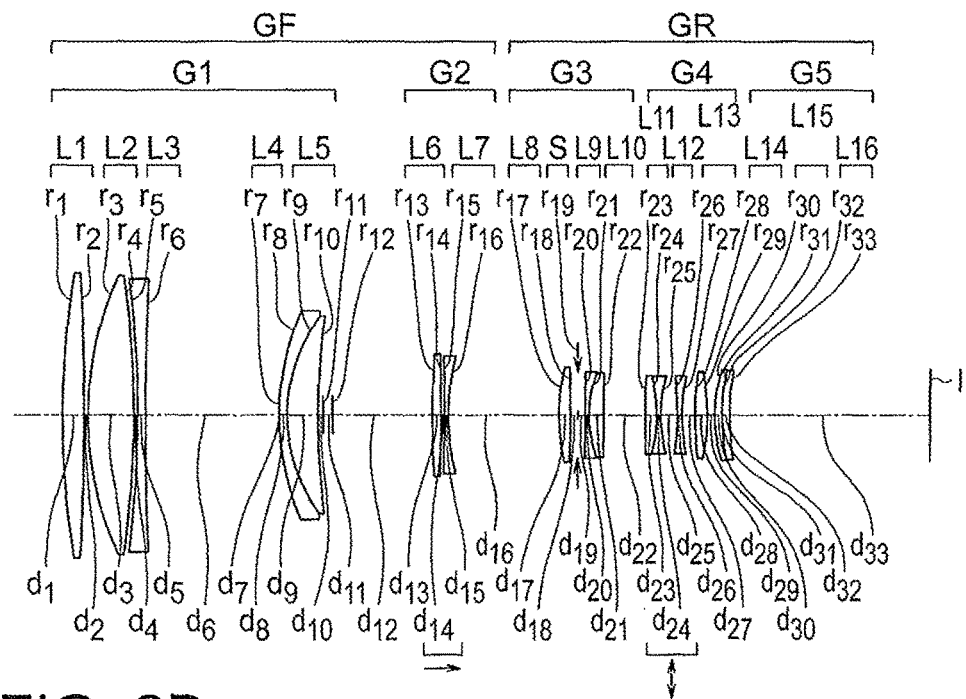
FIG. 2A and FIG. 2B are lens cross-sectional views at the time of focusing at an object at infinity of an image forming lens system according to the present invention, where.

An image forming lens system according to the example 3, as shown in FIG. 2A, includes in order from an object side to an image side, a front lens unit GF having a positive refractive power and a rear lens unit GR having a positive refractive power. The rear lens unit GR includes an aperture stop. Here, r19 is the aperture stop, and r7, r11, and r12 are virtual surfaces.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, and a fifth lens unit G5 having a positive refractive power.

The first lens unit G1 includes a biconvex positive lens L1, a biconvex positive lens L2, a biconcave negative lens L3, a negative meniscus lens L4 having a convex surface directed toward the object side, and a positive meniscus lens L5 having a convex surface directed toward the object side. Here, the negative meniscus lens L4 and the positive meniscus lens L5 are cemented.

Moreover, a $1\text{-}1^{th}$ sub lens unit includes the biconvex positive lens L1, the biconvex positive lens L2, and the biconcave negative lens L3. A $1\text{-}2^{th}$ sub lens unit includes the negative meniscus lens L4 and the positive meniscus lens L5. The $1\text{-}1^{th}$ sub lens unit has a positive refractive power and the $1\text{-}2^{th}$ sub lens unit has a positive refractive power.

The second lens unit G2 includes a biconvex positive lens L6 and a biconcave negative lens L7. The second lens unit G2 is a focusing lens unit, and moves toward the image side along an optical axis, at the time of focusing from an object at infinity to an object at a close distance.

The third lens unit G3 includes a biconvex positive lens L8, a negative meniscus lens L9 having a convex surface directed toward the object side, and a positive meniscus lens L10 having a convex surface directed toward the object side. Here, the negative meniscus lens L9 and the positive meniscus lens L10 are cemented. An aperture stop S is disposed between the biconvex positive lens L8 and the negative meniscus lens L9.

The fourth lens unit G4 includes a biconvex positive lens L11, a biconcave negative lens L12, and a biconcave negative lens L13. Here, the biconvex positive lens L11 and the biconcave negative lens L12 are cemented. The fourth lens unit G4 is an image-motion correcting lens unit, and moves in a direction different from an optical axial direction, such as a direction orthogonal to the optical axis, at the time of correcting image motion.

The fifth lens unit G5 includes a biconvex positive lens L14, a positive meniscus lens L15 having a convex surface directed toward the object side, and a positive meniscus lens L16 having a convex surface directed toward the object side.

Figure 2B:
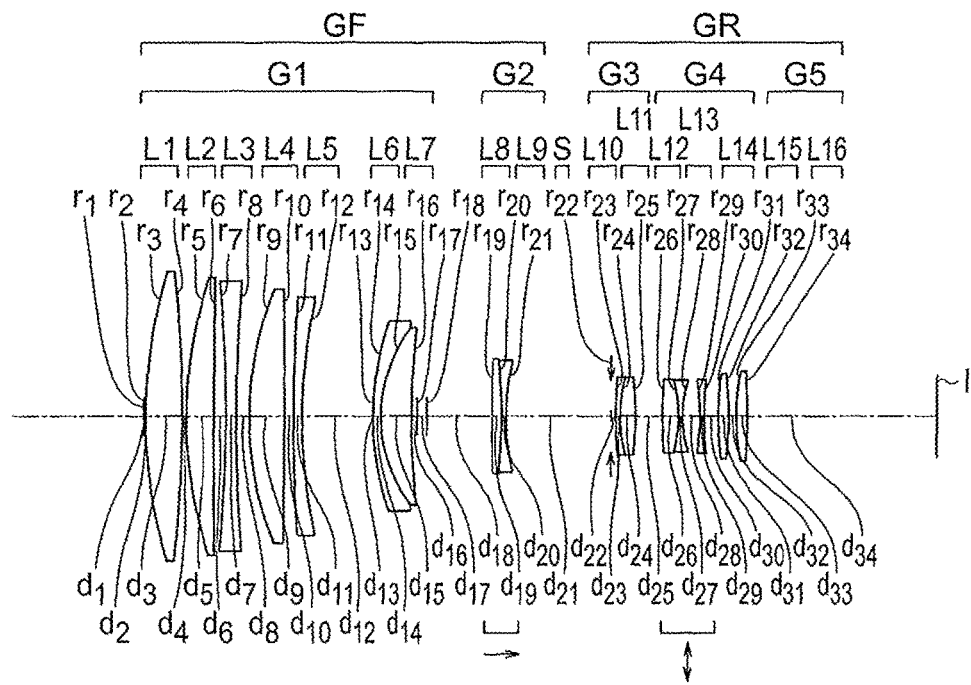

An image forming lens system according to the example 4, as shown in FIG. 2B, includes in order from an object side to an image side, a front lens unit GF having a positive refractive power and a rear lens unit GR having a negative refractive power. The rear lens unit GR includes an aperture stop. Here, r22 is the aperture stop, and r1, r2, r13, r17, and r18 are virtual surfaces.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, and a fifth lens unit G5 having a positive refractive power.

The first lens unit G1 includes a biconvex positive lens L1, a positive meniscus lens L2 having a convex surface directed toward the object side, a biconcave negative lens L3, a biconvex positive lens L4, a negative meniscus lens L5 having a convex surface directed toward the object side, a negative meniscus lens L6 having a convex surface directed toward the object side, and a positive meniscus lens L7 having a convex surface directed toward the object side. Here, the negative meniscus lens L6 and the positive meniscus lens L7 are cemented.

Moreover, a $1\text{-}1^{th}$ sub lens unit includes the biconvex positive lens L1, the positive meniscus lens L2, the biconcave negative lens L3, the biconvex positive lens L4, and the negative meniscus lens L5. A $1\text{-}2^{th}$ sub lens unit includes the negative meniscus lens L6 and the positive meniscus lens L7. The $1\text{-}1^{th}$ sub lens unit has a positive refractive power and the $1\text{-}2^{th}$ sub lens unit has a positive refractive power.

The second lens unit G2 includes a biconvex positive lens L8 and a biconcave negative lens L9. Here, the biconvex positive lens L8 and the biconcave negative lens L9 are cemented. The second lens unit G2 is a focusing lens unit, and moves toward the image side along an optical axis, at the time of focusing from an object at infinity to an object at a close distance.

The third lens unit G3 includes a negative meniscus lens L10 having a convex surface directed toward the object side and a biconvex positive lens L11. Here, the negative meniscus lens L10 and the biconvex positive lens L11 are cemented.

The fourth lens unit G4 includes a biconvex positive lens L12, a biconcave negative lens L13, and a biconcave negative lens L14. Here, the biconvex positive lens L12 and the biconcave negative lens L13 are cemented. The fourth lens unit G4 is an image-motion correcting lens unit, and moves in a direction different from an optical axial direction, such as a direction orthogonal to the optical axis, at the time of correcting image motion.

The fifth lens unit G5 includes a biconvex positive lens L15 and a biconvex positive lens L16.

Figure 3:
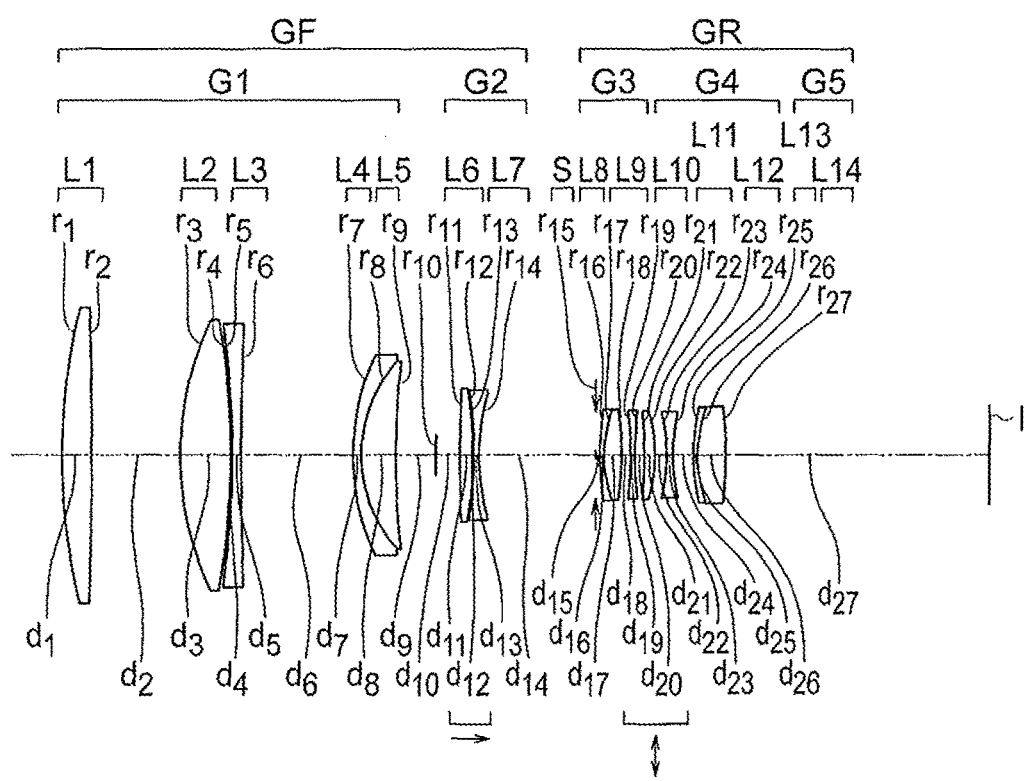
FIG. 3 is a lens cross-sectional view at the time of focusing at an object at infinity of an image forming lens system according to the present invention, where.
Figures 4A, 4B, 4C, 4D:
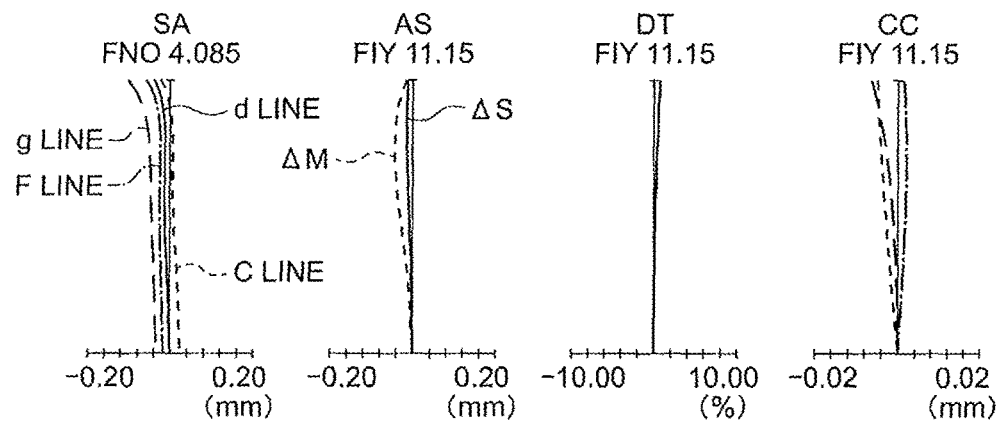
FIG. 4A, FIG. 4B, FIG. 4C, and FIG. 4D are aberration diagrams at the time of focusing at an object at infinity of the image forming lens system according to the example 1.
Figures 4E, 4F, 4G, 4H:
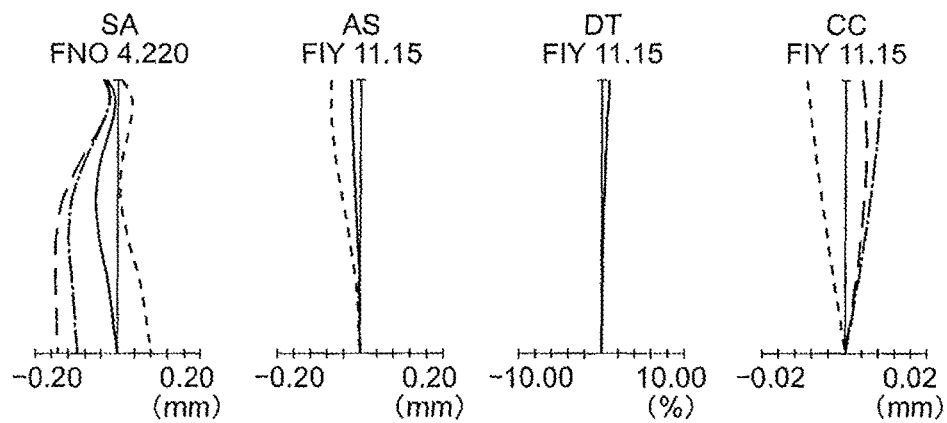
FIG. 4E, FIG. 4F, FIG. 4G, and FIG. 4H are aberration diagrams at the time of focusing at an object at a close distance of the image forming lens system according to the example 1.
Figures 6A, 6B, 6C, 6D:
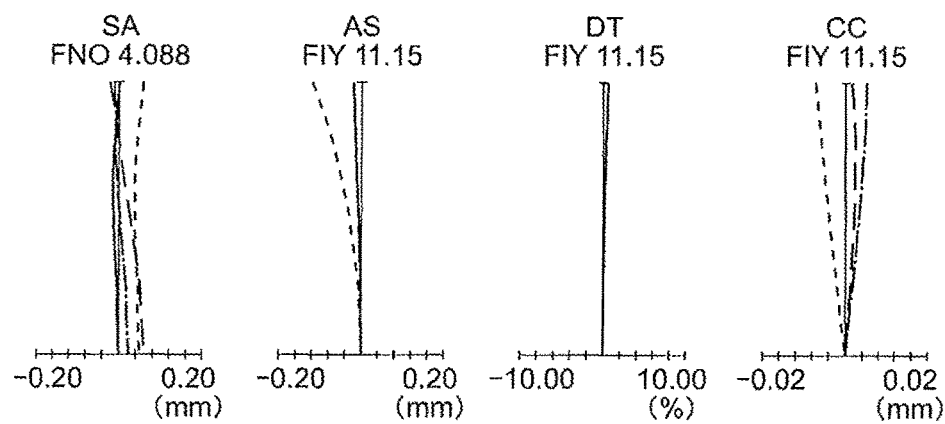
FIG. 6A, FIG. 6B, FIG. 6C, and FIG. 6D are aberration diagrams at the time of focusing at an object at infinity of the image forming lens system according to the example 3.
Figures 6E, 6F, 6G, 6H:
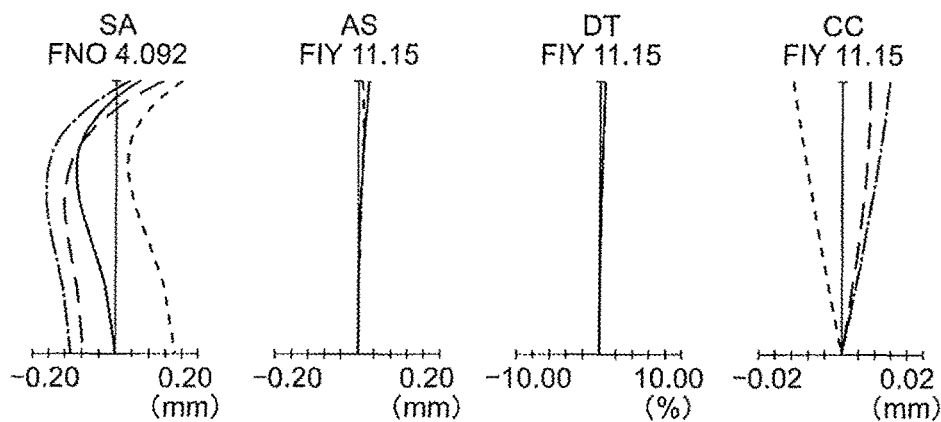
FIG. 6E, FIG. 6F, FIG. 6G, and FIG. 6H are aberration diagrams at the time of focusing at an object at a close distance of the image forming lens system according to the example 3.

An image forming lens system according to the example 5, as shown in FIG. 3, includes in order from an object side to an image side, a front lens unit GF having a positive refractive power and a rear lens unit GR having a negative refractive power. The rear lens unit GR includes an aperture stop. Here, r15 is the aperture stop, and r10 is a virtual surface.

The front lens unit GF includes in order from the object side to the image side, a first lens unit G1 having a positive refractive power and a second lens unit G2 having a negative refractive power. The rear lens unit GR includes a third lens unit G3 having a positive refractive power, a fourth lens unit G4 having a negative refractive power, and a fifth lens unit G5 having a positive refractive power.

The first lens unit G1 includes a biconvex positive lens L1, a biconvex positive lens L2, a biconcave negative lens L3, a negative meniscus lens L4 having a convex surface directed toward the object side, and a positive meniscus lens L5 having a convex surface directed toward the object side. Here, the negative meniscus lens L4 and the positive meniscus lens L5 are cemented.

Moreover, a $1\text{-}1^{th}$ sub lens unit includes the biconvex positive lens L1, the biconvex positive lens L2, and the biconcave negative lens L3. A $1\text{-}2^{th}$ sub lens unit includes the negative meniscus lens L4 and the positive meniscus lens L5. The 1-1$^{th}$ sub lens unit has a positive refractive power and the 1-2$^{th}$ sub lens unit has a positive refractive power.

The second lens unit G2 includes a biconvex positive lens L6 and a biconcave negative lens L7. The second lens unit G2 is a focusing lens unit, and moves toward the image side along an optical axis, at the time of focusing from an object at infinity to an object at a close distance.

The third lens unit G3 includes a negative meniscus lens L8 having a convex surface directed toward the object side and a biconvex positive lens L9. The negative meniscus lens L8 and the biconvex positive lens L9 are cemented.

The fourth lens unit G4 includes a biconcave negative lens L10, a positive meniscus lens L11 having a convex surface directed toward the image side, and a biconcave negative lens L12. The fourth lens unit G4 is an image-motion correcting lens unit, and moves in a direction different from an optical axial direction, such as a direction orthogonal to the optical axis, at the time of correcting image motion.

The fifth lens unit G5 includes a negative meniscus lens L13 having a convex surface directed toward the object side and a biconvex positive lens L14. Here, the negative meniscus lens L13 and the biconvex positive lens L14 are cemented.

Numerical data of each example is shown below. Apart from the aforementioned symbols, r denotes a radius of curvature of a lens surface, d denotes a distance between lens surfaces, nd denotes a refractive index for a d-line of each lens, and vd denotes Abbe number for each lens. Moreover f denotes a focal length of the overall image forming lens system, FNO. denotes an F-number, ω denotes a half angle of view, IH denotes an image height, FB denotes a back focus, and Lens total length is a distance from a lens surface nearest to the object of the image forming lens system up to a lens surface nearest to the image of the image forming lens system. FB (back focus) is a value which is a distance from the last lens surface up to a paraxial image plane expressed upon air conversion. Moreover, the unit of length for each numerical value is mm, and the unit of angle is ° (degree).

Moreover, Infinity indicates the time of focusing at an object at infinity and Close distance indicates the time of focusing at an object at a close distance. Here, values in a column of close distance are values in a state of being focused at an object at a closest distance. A practical distance between an object and an image in the state of being focused at an object at a closest distance is 1.4 m in the examples 1, 2, 3, 4, and 5.

Example 1

| Unit mm | | | |
|---|---|---|---|
| Surface data | | | |
| Surface no. | r | d | nd | vd |
|---|---|---|---|---|
| 1 | 265.067 | 5.20 | 1.58913 | 61.14 |
| 2 | -1490.468 | 1.00 | | |
| 3 | 59.582 | 12.50 | 1.43875 | 94.93 |
| 4 | 435.993 | 2.00 | 1.69680 | 55.53 |
| 5 | 172.557 | 26.62 | | |
| 6 | 57.861 | 2.00 | 1.77250 | 49.60 |
| 7 | 33.305 | 13.30 | 1.43875 | 94.93 |
| 8 | -2433.738 | 3.83 | | |
| 9 | 1376.956 | 5.40 | 1.62588 | 35.70 |
| 10 | -79.834 | 1.50 | 1.79952 | 42.22 |
| 11 | 265.360 | Variable | | |
| 12 | 405.447 | 2.00 | 1.80810 | 22.76 |
| 13 | -4629.782 | 1.00 | 1.64000 | 60.08 |
| 14 | 51.816 | Variable | | |
| 15 (Stop) | ∞ | 2.04 | | |
| 16 | 43.323 | 1.76 | 1.84666 | 23.78 |
| 17 | 28.126 | 4.81 | 1.48749 | 70.23 |
| 18 | -260.562 | 12.64 | | |
| 19 | 76.376 | 3.00 | 1.80518 | 25.42 |
| 20 | -77.000 | 1.00 | 1.60300 | 65.44 |
| 21 | 24.084 | 2.89 | | |
| 22 | -57.663 | 1.20 | 1.83481 | 42.71 |
| 23 | 64.994 | 3.50 | | |
| 24 | 45.024 | 3.80 | 1.65100 | 56.16 |
| 25 | -77.402 | 2.19 | | |
| 26 | 40.470 | 1.50 | 1.75500 | 52.32 |
| 27 | 19.851 | 4.50 | 1.56732 | 42.82 |
| 28 | 80.023 | | | |
| Image plane | ∞ | | | |

| Various data | | |
|---|---|---|
| | Infinity | Close distance |
| f | 294.33 | |
| FNO. | 4.08 | |
| 2ω (Angle of view) | 4.31 | |
| IH | 11.15 | |
| FB | 45.04 | |
| Lens total length | 213.64 | 213.64 |
| d11 | 17.02 | 41.92 |
| d14 | 30.40 | 5.50 |

Example 2

| Unit mm | | | |
|---|---|---|---|
| Surface data | | | |
| Surface no. | r | d | nd | vd |
|---|---|---|---|---|
| 1 | 194.243 | 5.20 | 1.48749 | 70.23 |
| 2 | 1167.575 | 1.00 | | |
| 3 | 70.800 | 12.40 | 1.43875 | 94.93 |
| 4 | -1405.411 | 2.00 | 1.69100 | 54.82 |
| 5 | 388.125 | 28.63 | | |
| 6 | 70.749 | 2.00 | 1.78800 | 47.37 |
| 7 | 39.267 | 11.00 | 1.43875 | 94.93 |
| 8 | 412.816 | 0.00 | | |
| 9 | ∞ | 5.01 | | |
| 10 | 115.990 | 6.10 | 1.60342 | 38.03 |
| 11 | -153.511 | 1.50 | 1.83481 | 42.71 |
| 12 | 146.105 | Variable | | |
| 13 | 807.147 | 1.80 | 1.78472 | 25.68 |
| 14 | -307.862 | 1.00 | 1.64000 | 60.08 |
| 15 | 53.770 | Variable | | |
| 16 | 72.543 | 2.80 | 1.84666 | 23.78 |
| 17 | 150.000 | 2.40 | | |
| 18(Stop) | ∞ | 1.80 | | |
| 19 | 66.610 | 1.00 | 1.84666 | 23.78 |
| 20 | 28.500 | 4.24 | 1.51633 | 64.14 |
| 21 | -237.459 | 15.51 | | |
| 22 | 126.318 | 3.00 | 1.80518 | 25.42 |
| 23 | -65.633 | 1.00 | 1.60300 | 65.44 |
| 24 | 24.000 | 3.25 | | |
| 25 | -44.111 | 1.20 | 1.79952 | 42.22 |
| 26 | 197.168 | 3.50 | | |
| 27 | 57.692 | 3.90 | 1.65100 | 56.16 |
| 28 | -56.296 | 10.54 | | |
| 29 | ∞ | 2.00 | | |

-continued

| Unit mm | | | | |
|---|---|---|---|---|
| 30 | 140.002 | 3.00 | 1.67270 | 32.10 |
| 31 | 600.028 | | | |
| Image plane | ∞ | | | |

| Various data | | |
|---|---|---|
| | Infinity | Close distance |
| f | 291.95 | |
| FNO. | 4.05 | |
| 2ω(Angle of view) | 4.36 | |
| IH | 11.15 | |
| FB | 40.77 | |
| Lens total length | 228.55 | 228.55 |
| d12 | 21.14 | 47.50 |
| d15 | 29.86 | 3.50 |

Example 3

| Unit mm | | | | |
|---|---|---|---|---|
| Surface data | | | | |
| Surface no. | r | d | nd | νd |
| 1 | 231.456 | 5.60 | 1.48749 | 70.23 |
| 2 | −784.109 | 1.00 | | |
| 3 | 90.000 | 12.05 | 1.43875 | 94.93 |
| 4 | −271.291 | 1.00 | | |
| 5 | −294.655 | 2.00 | 1.72916 | 54.68 |
| 6 | 781.057 | 35.27 | | |
| 7 | ∞ | 0.00 | | |
| 8 | 71.571 | 2.00 | 1.81600 | 46.62 |
| 9 | 45.000 | 8.13 | 1.43875 | 94.93 |
| 10 | 198.960 | 1.44 | | |
| 11 | ∞ | 2.50 | | |
| 12 | ∞ | Variable | | |
| 13 | 231.285 | 2.30 | 1.92286 | 18.90 |
| 14 | −914.014 | 0.90 | | |
| 15 | −411.494 | 1.00 | 1.88300 | 40.76 |
| 16 | 65.828 | Variable | | |
| 17 | 52.334 | 3.00 | 1.80100 | 34.97 |
| 18 | −592.949 | 2.00 | | |
| 19(Stop) | ∞ | 1.85 | | |
| 20 | 1074.650 | 1.00 | 1.84666 | 23.78 |
| 21 | 30.600 | 3.92 | 1.51633 | 64.14 |
| 22 | 2693.557 | 10.92 | | |
| 23 | 325.054 | 3.00 | 1.80518 | 25.42 |
| 24 | −43.000 | 1.00 | 1.60300 | 65.44 |
| 25 | 36.884 | 4.40 | | |
| 26 | −88.302 | 1.20 | 1.83481 | 42.71 |
| 27 | 49.112 | 3.50 | | |
| 28 | 93.257 | 3.15 | 1.63930 | 44.87 |
| 29 | −60.457 | 1.87 | | |
| 30 | 37.180 | 1.99 | 1.51823 | 58.90 |
| 31 | 57.000 | 0.00 | | |
| 32 | 57.000 | 2.00 | 1.84666 | 23.78 |
| 33 | 72.000 | | | |
| Image plane | ∞ | | | |

| Various data | | |
|---|---|---|
| | Infinity | Close distance |
| f | 295.83 | |
| FNO. | 4.09 | |
| 2ω(Angle of view) | 4.29 | |
| IH | 11.15 | |
| FB | 53.06 | |
| Lens total length | 228.91 | 228.91 |
| d12 | 26.61 | 51.86 |
| d16 | 29.25 | 4.00 |

Example 4

| Unit mm | | | | |
|---|---|---|---|---|
| Surface data | | | | |
| Surface no. | r | d | nd | νd |
| 1 | ∞ | 0.00 | | |
| 2 | ∞ | 0.00 | | |
| 3 | 130.284 | 9.05 | 1.49700 | 81.54 |
| 4 | −356.376 | 1.00 | | |
| 5 | 112.132 | 7.00 | 1.49700 | 81.54 |
| 6 | 2019.924 | 3.12 | | |
| 7 | −378.439 | 2.50 | 1.81600 | 46.62 |
| 8 | 443.781 | 3.16 | | |
| 9 | 84.662 | 8.81 | 1.49700 | 81.54 |
| 10 | −2126.642 | 2.26 | | |
| 11 | 464.562 | 2.08 | 1.72916 | 54.68 |
| 12 | 135.009 | 17.92 | | |
| 13 | ∞ | 0.00 | | |
| 14 | 72.538 | 2.00 | 1.72916 | 54.68 |
| 15 | 36.937 | 7.80 | 1.43875 | 94.93 |
| 16 | 201.138 | 1.44 | | |
| 17 | ∞ | 2.50 | | |
| 18 | ∞ | Variable | | |
| 19 | 669.312 | 2.46 | 1.84666 | 23.78 |
| 20 | −146.217 | 1.09 | 1.81600 | 46.62 |
| 21 | 63.670 | Variable | | |
| 22(Stop) | ∞ | 1.26 | | |
| 23 | 107.461 | 1.00 | 1.84666 | 23.88 |
| 24 | 33.036 | 3.90 | 1.60300 | 65.44 |
| 25 | −103.883 | 6.71 | | |
| 26 | 121.257 | 4.00 | 1.80518 | 25.42 |
| 27 | −39.538 | 1.00 | 1.75500 | 52.32 |
| 28 | 28.312 | 4.40 | | |
| 29 | −69.204 | 1.00 | 1.81600 | 46.62 |
| 30 | 84.343 | 3.50 | | |
| 31 | 81.637 | 2.68 | 1.62004 | 36.26 |
| 32 | −88.059 | 1.77 | | |
| 33 | 57.133 | 2.75 | 1.54814 | 45.79 |
| 34 | −255.125 | | | |
| Image plane | ∞ | | | |

| Various data | | |
|---|---|---|
| | Infinity | Close distance |
| f | 294.28 | |
| FNO. | 4.08 | |
| 2ω(Angle of view) | 4.30 | |
| IH | 11.15 | |
| FB | 47.81 | |
| Lens total length | 198.62 | 198.62 |
| d18 | 16.52 | 35.15 |
| d21 | 26.14 | 7.50 |

Example 5

| Unit mm | | | | |
|---|---|---|---|---|
| Surface data | | | | |
| Surface no. | r | d | nd | νd |
| 1 | 159.069 | 7.25 | 1.48749 | 70.23 |
| 2 | −1234.289 | 21.66 | | |
| 3 | 81.413 | 12.50 | 1.43875 | 94.93 |
| 4 | −204.639 | 0.50 | | |
| 5 | −235.149 | 2.00 | 1.78590 | 44.20 |
| 6 | 833.104 | 27.88 | | |
| 7 | 61.034 | 2.00 | 1.71999 | 50.23 |
| 8 | 35.478 | 8.53 | 1.43875 | 94.93 |
| 9 | 205.759 | 10.00 | | |

-continued

| Unit mm | | | | |
|---|---|---|---|---|
| 10 | ∞ | Variable | | |
| 11 | 343.549 | 3.00 | 1.92286 | 18.90 |
| 12 | −135.982 | 0.50 | | |
| 13 | −106.323 | 1.10 | 1.69895 | 30.13 |
| 14 | 56.725 | Variable | | |
| 15(Stop) | ∞ | 1.00 | | |
| 16 | 81.892 | 1.00 | 1.85026 | 32.27 |
| 17 | 33.821 | 4.29 | 1.48749 | 70.23 |
| 18 | −74.649 | 2.25 | | |
| 19 | −88.206 | 1.00 | 1.49700 | 81.54 |
| 20 | 110.546 | 2.30 | | |
| 21 | −107.075 | 2.60 | 1.84666 | 23.78 |
| 22 | −38.630 | 3.00 | | |
| 23 | −43.284 | 1.50 | 1.77250 | 49.60 |
| 24 | 48.410 | 5.00 | | |
| 25 | 53.727 | 1.00 | 1.84666 | 23.78 |
| 26 | 33.300 | 7.00 | 1.72047 | 34.71 |
| 27 | −105.115 | | | |
| Image plane | ∞ | | | |

| Various data | | |
|---|---|---|
| | Infinity | Close distance |
| f | 296.99 | |
| FNO. | 36.49 | |
| 2ω(Angle of view) | 4.27 | |
| IH | 11.15 | |
| FB | 65.35 | |
| Lens total length | 229.40 | 229.40 |
| d10 | 6.00 | 27.21 |
| d14 | 29.21 | 8.00 |

Aberration diagrams of the examples from the example 1 to the example 5 described above are shown in FIG. 4A, FIG. 4B, FIG. 4C, FIG. 4D, FIG. 4E, FIG. 4F, FIG. 4G, and FIG. 4H to FIG. 8A, FIG. 8B, FIG. 8C, FIG. 8D, FIG. 8E, FIG. 8F, FIG. 8G, and FIG. 8H. In each aberration diagram, FIY denotes the maximum image height.

In these aberration diagrams, FIG. 4A, FIG. 5A, FIG. 6A, FIG. 7A, and FIG. 8A show a spherical aberration (SA) at the time of focusing at an object at infinity, FIG. 4B, FIG. 5B, FIG. 6B, FIG. 7B, and FIG. 8B show an astigmatism (AS) at the time of focusing at an object at infinity, FIG. 4C, FIG. 5C, FIG. 6C, FIG. 7C, and FIG. 8C show a distortion (DT) at the time of focusing at an object at infinity, and FIG. 4D, FIG. 5D, FIG. 6D, FIG. 7D, and FIG. 8D show a chromatic aberration of magnification (CC) at the time of focusing at an object at infinity.

Moreover, FIG. 4E, FIG. 5E, FIG. 6E, FIG. 7E, and FIG. 8E show a spherical aberration (SA) at the time of focusing at an object at a close distance, FIG. 4F, FIG. 5F, FIG. 6F, FIG. 7F, and FIG. 8F show an astigmatism (AS) at the time of focusing at an object at a close distance, FIG. 4G, FIG. 5G, FIG. 6G, FIG. 7G, and FIG. 8G show a distortion (DT) at the time of focusing at an object at a close distance, and FIG. 4H, FIG. 5H, FIG. 6H, FIG. 7H, and FIG. 8H show a chromatic aberration of magnification (CC) at the time of focusing at an object at a close distance.

Next, values of conditional expressions (1) to (10) in each example are given below.

| Conditional expressions | Example 1 | Example 2 | Example 3 |
|---|---|---|---|
| (1) $f_{FF}/f$ | 1.16 | 1.41 | 1.34 |
| (2), (2') $f/|r_{2Gb}|$ | 1.11 | 2.01 | 1.49 |
| (3), (3') $|f_{fo}|/f$ | −0.33 | −0.33 | −0.33 |
| (4) $f_b/f$ | 0.15 | 0.14 | 0.18 |

-continued

| | | | |
|---|---|---|---|
| (5) $|MG_{ISback} \times (MG_{IS} - 1)|$ | 2.01 | 1.98 | 2.01 |
| (6) $|(MG_{foback})^2 \times \{(MG_{fo})^2 - 1\}|$ | 3.5 | 3.27 | 3.44 |
| (7) $f_{FF}/f_{fo}$ | −3.50 | −4.33 | −4.12 |
| (8) $D_{G1}/f_{G1}$ | 0.51 | 0.50 | 0.45 |
| (9) $D_{G112}/f_{G1}$ | 0.19 | 0.19 | 0.24 |
| (10) $|f_{G1}/f_{fo}|$ | 1.47 | 1.57 | 1.54 |

| Conditional expressions | Example 4 | Example 5 |
|---|---|---|
| (1) $f_{FF}/f$ | 0.81 | 0.80 |
| (2), (2') $f/|r_{2Gb}|$ | 1.46 | 1.44 |
| (3), (3') $|f_{fo}|/f$ | −0.30 | −0.36 |
| (4) $f_b/f$ | 0.16 | 0.22 |
| (5) $|MG_{ISback} \times (MG_{IS} - 1)|$ | 2 | 2 |
| (6) $|(MG_{foback})^2 \times \{(MG_{fo})^2 - 1\}|$ | 4.5 | 4.08 |
| (7) $f_{FF}/f_{fo}$ | −2.68 | −2.21 |
| (8) $D_{G1}/f_{G1}$ | 0.56 | 0.66 |
| (9) $D_{G112}/f_{G1}$ | 0.15 | 0.22 |
| (10) $|f_{G1}/f_{fo}|$ | 1.35 | 1.16 |

Figure 9:
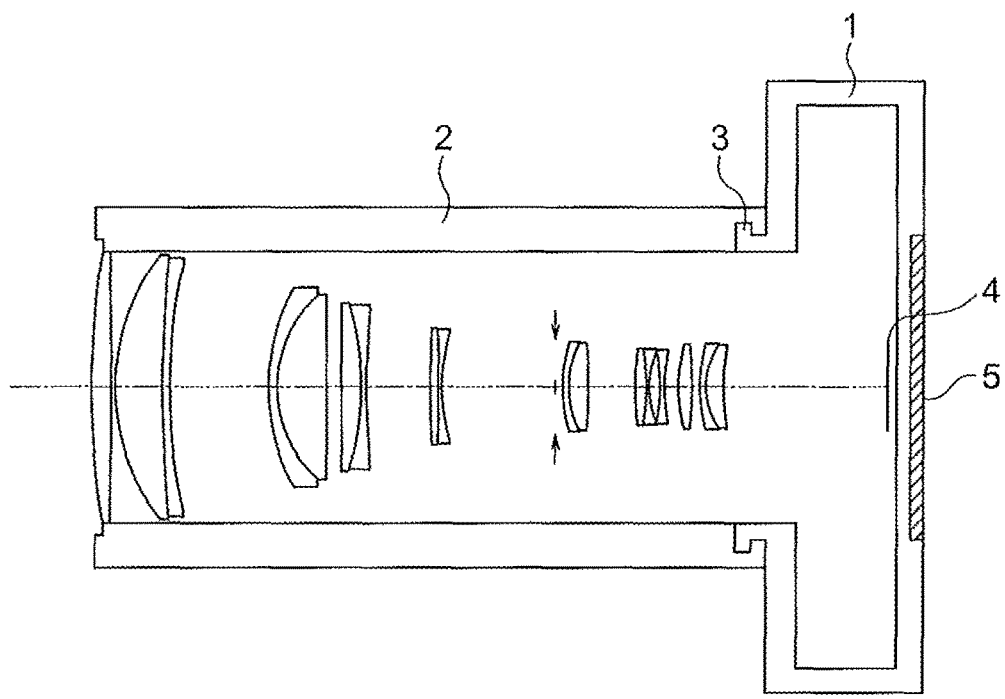
FIG. 9 is a cross-sectional view of a digital camera in which, the image forming lens system according to the example 1 is incorporated.

FIG. 9 is a cross-sectional view of a single-lens mirrorless camera as an electronic image pickup apparatus. In FIG. 9, a taking lens system. 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the image forming lens system described in any one of the examples from the first example to the fifth example is to be used.

Figure 10:
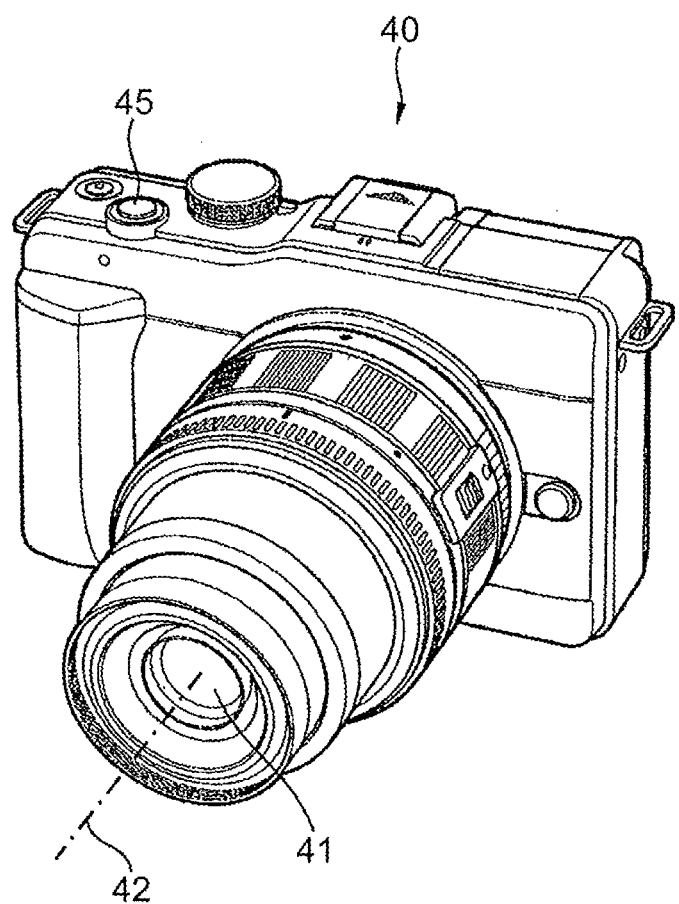
FIG. 10 is a front perspective view of the digital camera.
Figure 11:
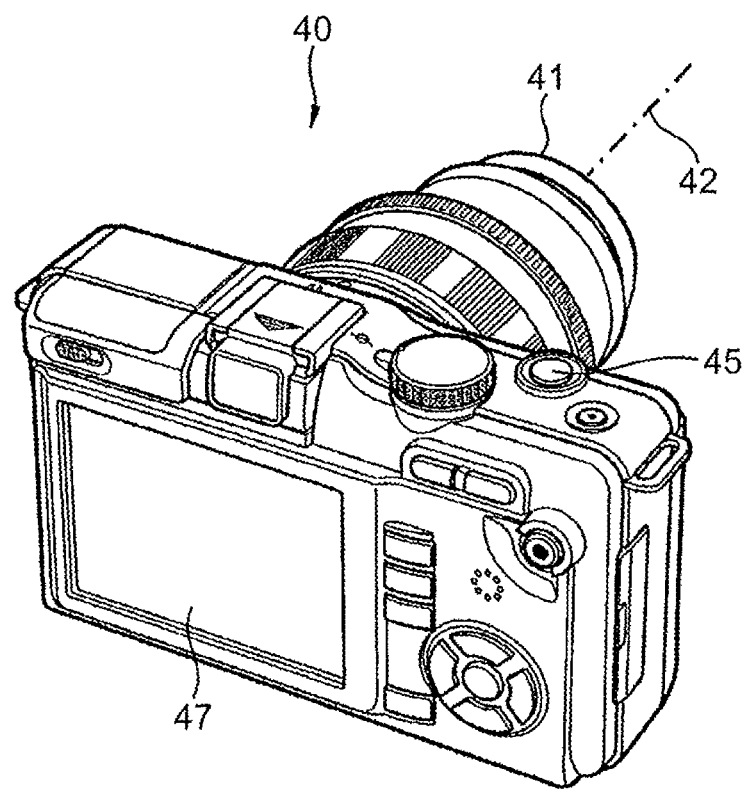
FIG. 11 is a rear perspective view of the digital camera.

FIG. 10 and FIG. 11 are conceptual diagrams of an arrangement of the image pickup apparatus according to the present invention. FIG. 10 is a front perspective view showing an appearance of a digital camera 40 as the image pickup apparatus, and FIG. 11 is a rear perspective view of the digital camera 40. The image forming lens system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the image forming lens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 12 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 12, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the digital camera 40 in which such an arrangement is made, by adopting the image forming lens system according to the present invention as the photographing optical system 41, since it is possible to make the diameter of the overall optical system small and to make the overall optical system light-weight, while maintaining a superior focusing performance, the digital camera 40 has a superior mobility, and enables to carry out photography with high resolution. Moreover, it is possible to use the image forming lens system according to the present invention in an image pickup apparatus of a type having a quick-return mirror.

According to the present invention, it is possible to provide an image forming lens system having a superior mobility in which, aberrations are corrected favorably, and an image pickup apparatus using the image forming lens system.

As described heretofore, in the image forming lens system according to the present invention, since it is possible to shorten the overall length of the optical system and to make the focusing lens unit light-weight, it is possible to realize making the optical system light-weight. Moreover, by making the focusing lens unit light-weight, it is possible to make the focusing unit small-sized and light-weight. For these reasons, the image forming lens system according to the present invention is suitable for a image forming lens system which has a superior mobility, and in which, aberrations are corrected favorably. Particularly, the image forming lens system according to the present invention is useful for a telephoto lens and an ultra-telephoto lens. Moreover, the image pickup apparatus according to the present invention is suitable for an image pickup apparatus which has a superior mobility, and which is capable of carrying out photography with high resolution.

What is claimed is:

1. An image forming lens system comprising in order from an object side to an image side along an optical axis:
a front lens unit having a positive refractive power; and
a rear lens unit, wherein
the image forming lens system does not include any other lens unit on the optical axis, and
the front lens unit includes in order from the object side to the image side, a first lens unit having a positive refractive power, and a second lens unit having a negative refractive power, and
each of the first lens unit and the second lens unit includes a positive lens and a negative lens, and
the second lens unit is a focusing lens unit, and
the focusing lens unit moves toward an image side along the optical axis at the time of focusing operation from an object at infinity to an object at a close distance, and
the second lens unit is the only lens unit that moves, in the front lens unit, and
the rear lens unit includes an image-motion correcting lens unit, and a first predetermined lens unit which is disposed on the object side of the image-motion correcting lens unit, immediately before the image-motion correcting lens unit, and
the image-motion correcting lens unit moves in a direction different from a direction of the optical axis to reduce an image motion due to shaking of the image forming lens system, and
the first predetermined lens unit has a refractive power having a sign different from a sign of a refractive power of the image-motion correcting lens unit, and
the following conditional expressions (1) and (2') are satisfied:

$$0.5 < f_{FF}/f < 1.65 \quad (1)$$

$$0 \leq |f/r_{G2b}| < 6.5 \quad (2')$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object.

2. The image forming lens system according to claim 1, comprising:

an aperture stop;

wherein the first predetermined lens unit which is disposed on the object side of the image-motion correcting lens unit, immediately before the image-motion correcting lens unit, is a lens unit having a positive refractive power, and positions of both the aperture stop and the lens unit having a positive refractive power are fixed.

3. The image forming lens system according to claim 1, wherein the focusing lens unit is a lens unit which is disposed nearest to the image, in the front lens unit, and the first lens unit includes all lenses disposed on the object side of the focusing lens unit and remain stationary, and the image-motion correcting lens unit has a positive refractive power and includes a positive lens and a negative lens, and all lenses other than the image-motion correcting lens unit included in the rear lens unit remain stationary.

4. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the second lens unit is the only lens unit that moves, in the front lens unit, and the rear lens unit includes an image-motion correcting lens unit, and a second predetermined lens unit which is disposed immediately after the image-motion correcting lens unit, and the image-motion correcting lens unit moves in a direction different from a direction of the optical axis to reduce an image motion due to shaking of the image forming lens system, and the second predetermined lens unit has a refractive power having a sign different from a sign of a refractive power of the image-motion correcting lens unit, and the following conditional expressions (1) and (2') are satisfied:

$$0.5 < f_{FF}/f < 1.65 \tag{1}$$

$$0 \le |f/r_{G2b}| < 6.5 \tag{2'}$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object.

5. The image forming lens system according to claim 4, wherein the focusing lens unit is a lens unit which is disposed nearest to the image, in the front lens unit, and the first lens unit includes all lenses disposed on the object side of the focusing lens unit and remain stationary, and the image-motion correcting lens unit has a positive refractive power and includes a positive lens and a negative lens, and all lenses other than the image-motion correcting lens unit included in the rear lens unit remain stationary.

6. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the second lens unit is the only lens unit that moves, in the front lens unit, and the rear lens unit includes an image-motion correcting lens unit, and a first predetermined lens unit which is disposed on the object side of the image-motion correcting lens unit, immediately before the image-motion correcting lens unit, and a second predetermined lens unit which is disposed on the image side of the image-motion correcting lens unit, immediately after the image-motion correcting lens unit, and the image-motion correcting lens unit moves in a direction different from a direction of the optical axis to reduce an image motion due to shaking of the image forming lens system, and each of the first predetermined lens unit and the second predetermined lens unit has a refractive power having a sign different from the sign of the refractive power of the image-motion correcting lens unit, and the following conditional expressions (1) and (2') are satisfied:

$$0.5 < f_{FF}/f < 1.65 \tag{1}$$

$$0 \le |f/r_{G2b}| < 6.5 \tag{2'}$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object.

7. The image forming lens system according to claim 6, wherein the focusing lens unit is a lens unit which is disposed nearest to the image, in the front lens unit, and the first lens unit includes all lenses disposed on the object side of the focusing lens unit and remain stationary, and the image-motion correcting lens unit has a positive refractive power and includes a positive lens and a negative lens, and all lenses other than the image-motion correcting lens unit included in the rear lens unit remain stationary.

8. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the second lens unit is the only lens unit that moves, in the front lens unit, and the rear lens unit includes a positive lens and an image-motion correcting lens unit having a negative refractive power and the image-motion correcting lens unit moves in a direction different from a direction of the optical axis to reduce an image motion due to shaking of the image forming lens system, and the following conditional expressions (1) and (2') are satisfied:

$$0.5 < f_{FF}/f < 1.65 \tag{1}$$

$$0 \leq |f/r_{G2b}| < 6.5 \tag{2'}$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object.

9. The image forming lens system according to claim 8, wherein the rear lens unit includes in order from the object side, a lens unit having a positive refractive power includes a positive lens, the image-motion correcting lens unit having a negative refractive power, and a lens unit having a positive refractive power.

10. The image forming lens system according to claim 8, wherein the focusing lens unit is a lens unit which is disposed nearest to the image, in the front lens unit, and the first lens unit includes all lenses disposed on the object side of the focusing lens unit and remain stationary, and the image-motion correcting lens unit has a positive refractive power and includes a positive lens and a negative lens, and all lenses other than the image-motion correcting lens unit included in the rear lens unit remain stationary.

11. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the following conditional expressions (1) and (2') are satisfied, and an image-motion correcting lens unit which satisfies the following conditional expression (5) is included in the image forming lens system:

$$0.5 < f_{FF}/f < 1.65 \tag{1}$$

$$0 \leq |f/r_{G2b}| < 6.5 \tag{2'}$$

$$0.8 < |MG_{ISback} \times (MG_{IS}-1)| < 5.0 \tag{5}$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object, and $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

12. The image forming lens system according to claim 11, wherein the focusing lens unit is a lens unit which is disposed nearest to the image, in the front lens unit, and the first lens unit includes all lenses disposed on the object side of the focusing lens unit and remains stationary, and the rear lens unit includes the image-motion correcting lens unit which has a positive refractive power and includes the positive lens and the negative lens, and the image-motion correcting lens unit moves in a direction different from a direction of the optical axis to reduce an image motion due to shaking of the image forming lens system, and all lenses other than the image-motion correcting lens unit included in the rear lens unit remain stationary.

13. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the following conditional expressions (1), (2') and (6) are satisfied:

$$0.5 < f_{FF}/f < 1.65 \quad (1)$$

$$0 \leq |f/r_{G2b}| < 6.5 \quad (2')$$

$$1.5 < |(MG_{foback})^2 \times \{(MG_{fo})^2 - 1\}| < 8.0 \quad (6)$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object, and $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

14. The image forming lens system according to claim 13, wherein the focusing lens unit is a lens unit which is disposed nearest to the image, in the front lens unit, and the first lens unit includes all lenses disposed on the object side of the focusing lens unit and remains stationary, and the rear lens unit includes the image-motion correcting lens unit which has a positive refractive power and includes the positive lens and the negative lens, and the image-motion correcting lens unit moves in a direction different from a direction of the optical axis to reduce an image motion due to shaking of the image forming lens system, and all lenses other than the image-motion correcting lens unit included in the rear lens unit remain stationary.

15. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and the 1-1$^{th}$ sub lens unit has a positive refractive power, and each of the 1-1$^{th}$ sub lens unit and the 1-2$^{th}$ sub lens unit includes a positive lens and a negative lens, and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the following conditional expressions (1), (2') and (8) are satisfied:

$$0.5 < f_{FF}/f < 1.65 \quad (1)$$

$$0 \leq |f/r_{G2b}| < 6.5 \quad (2')$$

$$0.35 < D_{G1}/f_{G1} < 1.3 \quad (8)$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object, and $D_{G1}$ denotes a distance on the optical axis from a lens surface nearest to an object of the first lens unit up to a lens surface nearest to an image of the first lens unit, and $f_{G1}$ denotes the focal length of the first lens unit.

16. The image forming lens system according to claim 15, wherein the focusing lens unit is a lens unit which is disposed nearest to the image, in the front lens unit, and the first lens unit includes all lenses disposed on the object side of the focusing lens unit and remains stationary, and the rear lens unit includes the image-motion correcting lens unit which has a positive refractive power and includes the positive lens and the negative lens, and the image-motion correcting lens unit moves in a direction different from a direction of the optical axis to reduce an image motion due to shaking of the image forming lens system, and all lenses other than the image-motion correcting lens unit included in the rear lens unit remain stationary.

17. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and the first lens unit includes a 1-1$^{th}$ sub lens unit on the object side, and a 1-2$^{th}$ sub lens unit on the image side, and an air space on an optical axis between the 1-1$^{th}$ sub lens unit and the 1-2$^{th}$ sub lens unit is the longest in the first lens unit, and the 1-1$^{th}$ sub lens unit has a positive refractive power, and each of the 1-1$^{th}$ sub lens unit and the 1-2$^{th}$ sub lens unit includes a positive lens and a negative lens, and the second lens unit includes a positive lens and a negative lens, and the second lens unit is a focusing lens unit, and the focusing lens unit moves toward an image side along the optical axis at the time of focusing operation from an object at infinity to an object at a close distance, and the rear lens unit includes a positive lens and a negative lens, and the second lens unit is the only lens unit that moves, in the front lens unit, and the following conditional expressions (1), (2') and (9) are satisfied:

$$0.5 < f_{FF}/f < 1.65 \qquad (1)$$

$$0 \le |f/r_{G2b}| < 6.5 \qquad (2')$$

$$0.1 < D_{G112} f_{G1} < 0.6 \qquad (9)$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object, and $D_{G112}$ denotes a distance on the optical axis between the 1-1$^{th}$ sub lens unit and the 1-2$^{th}$ sub lens unit, and $f_{G1}$ denotes the focal length of the first lens unit.

18. The image forming lens system according to claim 17, wherein the focusing lens unit is a lens unit which is disposed nearest to the image, in the front lens unit, and the first lens unit includes all lenses disposed on the object side of the focusing lens unit and remains stationary, and the rear lens unit includes the image-motion correcting lens unit which has a positive refractive power and includes the positive lens and the negative lens, and the image-motion correcting lens unit moves in a direction different from a direction of the optical axis to reduce an image motion due to shaking of the image forming lens system, and all lenses other than the image-motion correcting lens unit included in the rear lens unit remain stationary.

19. An image forming lens system comprising in order from an object side to an image side along an optical axis:

a front lens unit having a positive refractive power; and a rear lens unit, wherein the image forming lens system does not include any other lens unit on the optical axis, and the front lens unit includes in order from the object side to the image side, a first lens unit having a positive refractive power, and a second lens unit having a negative refractive power, and each of the first lens unit and the second lens unit includes a positive lens and a negative lens, and the second lens unit is a focusing lens unit, and the focusing lens unit moves toward an image side along the optical axis at the time of focusing operation from an object at infinity to an object at a close distance, and the second lens unit is the only lens unit that moves, in the front lens unit, and the rear lens includes in order from the object side to the image side, a lens unit having a positive refractive power, a lens unit having a negative refractive power, and a lens unit having a positive refractive power, and the lens unit having a positive refractive power positioned on the object side of the lens unit having a negative refractive power in the rear lens unit includes two sub lens units having a positive refractive power, and an aperture stop is disposed to be sandwiched between the two sub lens units, and the following conditional expressions (1) and (2') are satisfied:

$$0.5 < f_{FF}/f < 1.65 \qquad (1)$$

$$0 \le |f/r_{G2b}| < 6.5 \qquad (2')$$

where, $f_{FF}$ denotes a focal length of the front lens unit at the time of focusing at an object at infinity, f denotes a focal length of the image forming lens system at the time of focusing at an object at infinity, and $r_{G2b}$ denotes a paraxial radius of curvature of a lens surface on the object side of the second lens unit, immediately before the object.

20. The image forming lens system according to claim 19, wherein the focusing lens unit is a lens unit which is disposed nearest to the image, in the front lens unit, and the first lens unit includes all lenses disposed on the object side of the focusing lens unit and remains stationary, and the rear lens unit includes the image-motion correcting lens unit which has a positive refractive power and includes the positive lens and the negative lens, and the image-motion correcting lens unit moves in a direction different from a direction of the optical axis to reduce an image motion due to shaking of the image forming lens system, and all lenses other than the image-motion correcting lens unit included in the rear lens unit remain stationary.

* * * * *